Oct. 28, 1952 A. E. HAGUE 2,615,628
AUTOMATIC ACCOUNTING DEVICE
Filed June 24, 1949 25 Sheets-Sheet 1

INVENTOR
A. E. HAGUE
BY John Atall
ATTORNEY

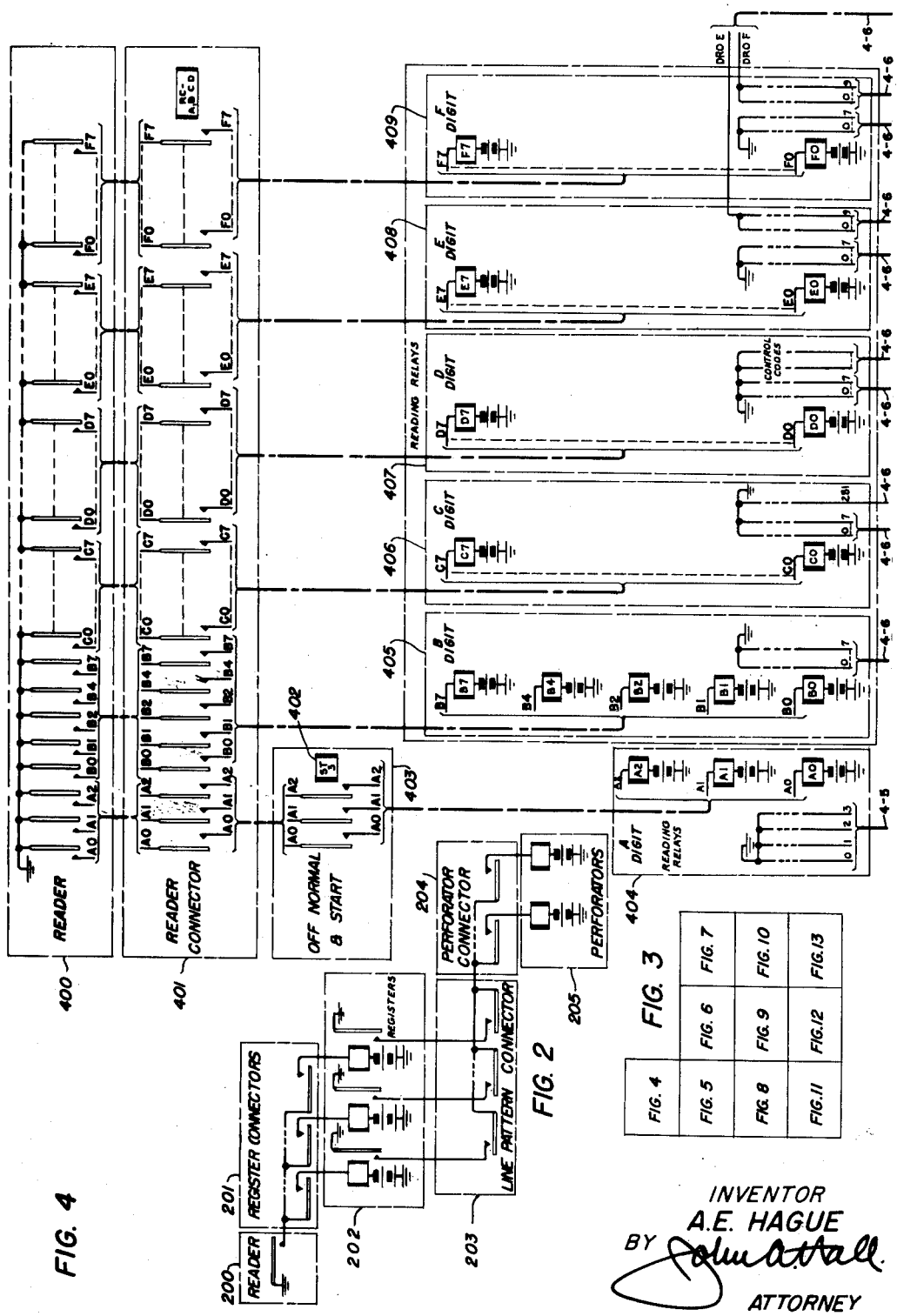

Oct. 28, 1952 A. E. HAGUE 2,615,628
AUTOMATIC ACCOUNTING DEVICE
Filed June 24, 1949 25 Sheets-Sheet 5

INVENTOR
A.E. HAGUE
BY
ATTORNEY

Oct. 28, 1952     A. E. HAGUE     2,615,628
AUTOMATIC ACCOUNTING DEVICE
Filed June 24, 1949     25 Sheets-Sheet 6

INVENTOR
A.E. HAGUE
BY John A. Hall
ATTORNEY

Oct. 28, 1952 A. E. HAGUE 2,615,628
AUTOMATIC ACCOUNTING DEVICE
Filed June 24, 1949 25 Sheets-Sheet 7

INVENTOR
A.E. HAGUE
BY John A. Hall
ATTORNEY

INVENTOR
A. E. HAGUE
BY John A. Hall
ATTORNEY

Oct. 28, 1952        A. E. HAGUE        2,615,628
AUTOMATIC ACCOUNTING DEVICE
Filed June 24, 1949        25 Sheets—Sheet 12
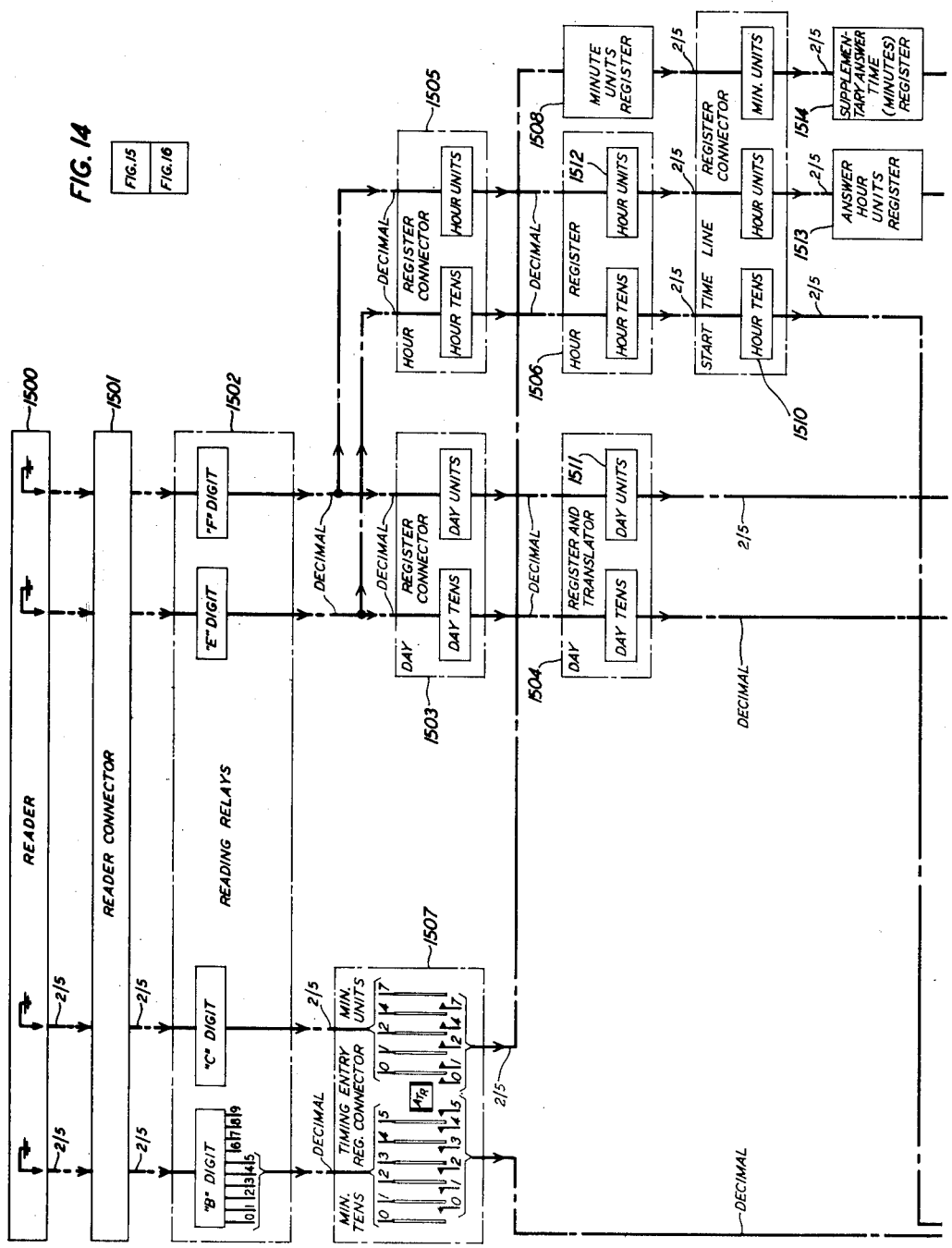
INVENTOR
A. E. HAGUE
BY
ATTORNEY INVENTOR
A. E. HAGUE
BY
John A. Hall
ATTORNEY Oct. 28, 1952 — A. E. HAGUE — 2,615,628
AUTOMATIC ACCOUNTING DEVICE
Filed June 24, 1949 — 25 Sheets-Sheet 16

INVENTOR
A. E. HAGUE
BY
ATTORNEY

Oct. 28, 1952     A. E. HAGUE     2,615,628
AUTOMATIC ACCOUNTING DEVICE

Filed June 24, 1949     25 Sheets-Sheet 17

INVENTOR
A. E. HAGUE
BY John A. Hall
ATTORNEY

Oct. 28, 1952          A. E. HAGUE          2,615,628

AUTOMATIC ACCOUNTING DEVICE

Filed June 24, 1949          25 Sheets—Sheet 20

INVENTOR
A. E. HAGUE
BY
ATTORNEY

Oct. 28, 1952  A. E. HAGUE  2,615,628
AUTOMATIC ACCOUNTING DEVICE
Filed June 24, 1949  25 Sheets-Sheet 25

FIG. 29

| | | | | |
|---|---|---|---|---|
| 081010 | | | | |
| 081010 | | | | |
| 081010 | | | | |
| 081010 | 008001 | 093010 | 008002 | 045970 |
| 289160 | 210100 | 003647 | 241426 | 230499 |
| 289200 | 083102 | 006003 | 033016 | 083102 |
| 289300 | 001070 | 250215 | 001730 | 000000 |
| 289419 | 003001 | 003003 | 015263 | 000007 |
| 289500 | 001288 | 019301 | 000011 | 289160 |
| 289690 | 017586 | 236426 | 241057 | 289200 |
| 289756 | 240100 | 033015 | 093009 | 289300 |
| 289805 | 033004 | 001987 | 056730 | 289419 |
| 289910 | 032330 | 007001 | 008000 | 289500 |
| 255300 | 004247 | 250726 | 000001 | 289690 |
| 053010 | 000002 | 063102 | 211057 | 289756 |
| 046404 | 250300 | 059402 | 093007 | 289805 |
| 235100 | 073010 | 230726 | 000945 | 289910 |
| 033004 | 020503 | 093102 | 009001 | 286000 |
| 000110 | 230300 | 002432 | 001564 | 081010 |
| | | | | 081010 |
| | | | | 081010 |
| | | | | 081010 |

| | | |
|---|---|---|
| 1 | 00 OCT 5 | |
| 2 | E03 00 CC 30 10 464 | AD |
| 3 ⊙ | E01 00 C 30 04 | ME6 0110 8 -- |
| 4 | L R01 00 N 31 02 | ME6 1070 3 -- CU8 1758M |
| 5 ⊙ | R01 00 C 30 04 323 30 04 247 | C- |
| 6 | R03 00 AC 30 10 205 | -C |
| 7 ⊙ | R03 00 A 30 10 | ME6 3647 6 -C |
| 8 | R02 15 P 30 03 193 | -- |
| 9 | - E14 26 C 30 15 | ME6 1987 7 -- |
| 10 ⊙ | R07 26 AN 31 02 594 | C- |
| 11 | - R07 26 A 31 02 | ME6 2432 8 C- |
| 12 ⊙ | R14 26 C 30 16 017 30 15 263 | S |
| 13 | R10 57 A 30 09 567 30 08 000 | -- |
| 14 ⊙ | L R10 57 A 30 07 | MEG 0945 9 -- L04 4597 |
| 15 | - R04 99 N 31 02 | ME6 0000 0 T |

INVENTOR
A. E. HAGUE
BY John A. Hall
ATTORNEY

Patented Oct. 28, 1952

2,615,628

UNITED STATES PATENT OFFICE 2,615,628

AUTOMATIC ACCOUNTING DEVICE

Alfred E. Hague, West Orange, N. J., assignor to Bell Telephone Laboratories, Incorporated, New York, N. Y., a corporation of New York Application June 24, 1949, Serial No. 101,089

12 Claims. (Cl. 235—61.7)

This invention relates to automatic accounting systems and particularly to systems wherein records automatically produced by and of customer uses of given facilities over variable time periods are processed by electrical devices in a number of steps to produce customer bills for the services rendered.

Objects of the invention are to provide means for collecting the data from various and scattered sources in the records, to eliminate unnecessary recorded information which cannot reasonably be considered as representing any data of a completed call, to consolidate recorded time information into a lesser number of digits for more convenient processing, to calculate the charges to be made, and other features including translation of the records into the form required for printing.

The present invention as exemplified herein resides in a plurality of circuit details of one of the electrical devices employed for one step in the automatic accounting process, that device known as the computer. This device, like the other devices employed, is arranged to take records from an incoming or old perforated tape, to modify the records in accordance with the purposes for which it is adapted and to produce a plurality of outgoing or new perforated tapes therefrom.

The original tape, automatically produced by customer use of given facilities contains scattered items of specific information, such as the initial entry, the answer or start time and the disconnect or termination time for each customer use and other items of general information, such as the general location of the using customer's facilities, the date, the hours and the identity of the billing period. This tape in a specific arrangement of an accounting system is employed as an incoming tape in a device known as an assembler, which collects or assembles the various and scattered items of specific information.

The next step in the accounting process is performed in the computer which takes the assembled items of specific information, calculates therefrom elapsed time, modifies the result in accordance with a billing index which indicates the rate of charges, translates this result into a number of unit charges (message units in an automatic message accounting system) and distributes the calculated charges along with accompanying details to one or another of a plurality of outgoing tapes.

In a specific embodiment of the invention the computer is provided with a reader for entering data from an incoming tape into its calculator and registers the nineteen perforators for distributing the processed data to nineteen outgoing tapes. There will be ten of such perforators assigned to the recording of message unit charges. If the tape is from a marker group serving more than one office, then as many of these perforators as there are offices will be used so that a separate outgoing tape for each office will be prepared. If the marker group contains but a single office then the charges will be sorted on a decimal basis either in accordance with the thousands digit of the called line number or in accordance with the units digit thereof. There will be six of such perforators assigned to the recording of detail calls, that is calls, the details of which will be reported on the customers' bills. Since the central office tapes are recorded by "rounds" and since the longest round provided for will consist of six days, then six perforators are provided so that the detail calls may be sorted by days. There will be one perforator assigned to the recording of irregular calls such as straddle calls or those occasional calls which exceed the capacity of the device such as those extending over a period of time greater than ninety-nine minutes. There will be one perforator assigned to the recording of the details of message unit calls where these details are sought for monitoring or other purposes by the customer. The customer's bill will nevertheless be rendered on the message unit basis so that a particular message unit call will be processed by the computer and two records produced therefrom, one in short form on one of the regular message unit tapes for billing purposes and another in longer form on the message unit detail record tape for supervisory purposes. And lastly there will be one perforator assigned to record the line observed calls, that is, a record made of all calls originated on certain lines put under observation under routine or on account of customer complaints.

The first seventeen output tapes including the ten message unit tapes, the six detail call tapes and the irregular call tape will contain billing information whereas the last two, the message unit detail call and the line observed call tapes will contain reference information. The distribution of calls to these nineteen outgoing channels is a function of the computer and in most cases is controlled by some index in the initial entry of each call, but may in other cases be controlled by extraordinary conditions derived or detected by the computer itself, as when the elapsed time calculated exceeds two digits (99 minutes). Thus, the computer translates, calculates, computes, sorts and otherwise rearranges the items of information found on an incoming tape to form a plurality of outgoing tapes carrying the thus processed information in another form.

By way of illustration, a number of examples of assembled call information as they appear on the incoming tape and as they are transformed for perforation on one or another of the outgoing tapes are given with a short explanation of certain features of the transformation.

(1) A message unit call entered as:

135246
131746
213046
005444 which is a call made from office 0 of the given marker group (identified in the tape identiy entries) from calling line 5444, and extending from 31.7 minutes to 35.2 minutes. The billing index (3), we will assume will cause the calculation of 3.5 minutes of elapsed time to indicate 2 message units, so that the computer will form and cause to be perforated on the number 5 perforator (thousands digit of calling line number, assuming a single office in the given marked group) the following output line:

125444

(2) A message unit call entered as:

135237
117537
214037
031234 which is a call from office 3 of the given marker group (identified in the tape identity entries) from calling line 1234 and extending from 17.5 minutes to 35.2 minutes. The billing index (4) we will assume will cause the calculation of 18.7 minutes of elapsed time to indicate 12 message units so that the computer will form and cause to be perforated on the number 3 perforator (sorted by office when the marker group contains more than one office) two output lines:

201234
000012

(3) A message unit call entered as:

101673
281021
156273
213073
005444 is one very similar to Example No. 1 except that it also includes an hour entry. The elapsed time is calculated as follows:

+01.6
+60.0
−56.2
───────
+ 5.4

If this in combination with the billing index indicates 3 message unit calls then the output will be:

135444

(4) A message unit call might appear as:

101652
281899
156252
213052
005444

The second line in this case is known as an irregular hour entry and while it does not show the actual hour it nevertheless sets the hour circuit back an hour so that the calculation is identical with Example No. 3 and the output line will be:

135444

(5) Should a call appear as follows:

101657
281021
281020
156257
213057
005444 then the calculation of elapsed time would be as follows:

+ 01.6
+120.0
− 56.2
───────
+ 65.4

Assuming that this elapsed time will indicate 27 message units, the output becomes:

235444
000027

(6) If the line 5444 of Example No. 1 were under observation, then the input to the computer would be as follows:

135246
131746
243046
005444
051133
010000

The entry index (the B digit of the first line of the initial entry) is 4 instead of 1 as in the first example, and two supplementary lines giving details of the called number are added. In this case the computer forms and causes to be perforated on the number 5 perforator, as before, the output line:

125444

This is billing information and will eventually be the data from which the customer's bill is made up.

In addition the computer forms and causes to be perforated on the line observation tape the following:

105444
062511
051133
010000
000402

This is supervisory information and is not used in forming bills but goes to company officials for various purposes such as routine checking, or for answering complaints, etc. The second line is formed by a translator from an assumed date (15th), hour (21) and answer time (31). The third and fourth lines are copies of the last two lines of the assembled call and the last line has a record of the message unit index (0), the chargeable time (04—rounded off from 3.5) and the number of message units charged (02).

(7) In Example No. 6 if the third line had been 233046 instead of 243046 then a message unit detail call is indicated. In such case the output line will be 125444 as before and the five-line detail information record will be exactly the same except that it will be perforated on the MUD tape instead of the LO tape and will eventually go to the customer for his information.

(8) A detail call read from the incoming tape as:

```
135213
131713
239013
005444
051133
010000
``` will be processed and distributed to the detail call output tape as:

```
105444
062511
051133
010000
000400
```

The first line of this output gives the calling line number. The second line is the start time line which is synthesized from the day (15), the hour (21) and minutes (31). The third and fourth lines are copies of the last two lines of the call as entered and the last line shows the chargeable time as 04 minutes. Note the difference between this and Example No. 6 where the number of message units (02) appeared as the last two digits of the last line. In the present case the message billing index (9) in the third line 239013 of the entries read from the incoming tape is a means which causes the last two digits of the last line of the processed call perforated on the detail call tape to be blanked out as 00.

(9) With a very slight difference, the digit 4 instead of the digit 3 as the B (or second) digit of the first line of the initial entry as:

```
135213
131713
249013
005444
051133
010000
``` the following record:

```
105444
062511
051133
010000
000400
``` will be perforated in both the line observing output tape and the detail call tape.

There are many variations of the above described patterns to take care of many operating contingencies and which need not be described in detail. One of the important circuits of the computer is the so-called straddle circuit for taking care of a variety of irregular calls and which are mainly recorded so that an operator or clerk may investigate the irregular circumstances and prepare a bill by hand.

In general, the computer consists of a plurality of registers into which both items of specific information and items of general information may be entered, a calculator, steering means, line forming pattern means and distributing means. Specific details of a call are entered, the elapsed time is calculated and this is weighted, rounded off and converted into charges, either chargeable time or a number of message units.

Again, generally, the first items of information entered in the computer are the recorder number, the hour and the day and these are registered before any specific problem is presented for calculation and remain registered until a complete group (for a single call identity index) of calls has been processed. During the processing of this group the hour and the day registrations are changed from time to time by the occurrence of an hour entry found among the scattered items of specific information.

The first of the specific items of information to be registered are the two items fixing the start and end of the customer use of the facilities and from these the calculator derives the elapsed time and transmits this to an elapsed time register where it is held under control of an output control circuit. Generally, the elapsed time may be calculated and registered before the initial entry giving other details of the customer use can be completely registered and the output lines formed and transmitted. To save time, an overlapping arrangement is employed, whereby after a calculation has been made and the elapsed time has been transferred to the elapsed time register but before the computer has transmitted the patterned lines to an output tape, the time element lines of the next call are entered in the calculator.

After the complete information has been registered in the computer the output control will cause the selection of a particular output channel and will transmit thereto the patterned lines such as those explained hereinabove.

The circuits are complex and are characterized by a great many check circuits for insuring accuracy. It is believed that the operation of this processing device can best be seen through a short description of the many novel features incorporated therein, as follows:

One of the elements of the computer is a device known as the start time line register used to gather and store information identifying the day, the hour and the minute at which a call was started and which will become one of the details of a customer charge where details of the charges made are presented to the customer. The information for the day is originally taken from the input tape but may be modified by the hour circuit. Such information is one of the items of general information common to a large group of calls. The information for the hour is taken from the hour circuit which is set and reset from periodically occurring hour entries on the incoming tape which are also items of general information common to a large group of calls. The information for the minute is taken from an item of specific information pertaining to a particular call. All these items are two-digit numbers and would ordinarily require six denominational places to express. However, it only requires the digits 0, 1, 2 and 3 to express the tens digits of any calendar day, the digits 0, 1 and 2 to express the tens digits of any of the twenty-four hours of a day and the digits 0 to 5, inclusive, to express the tens digits of any of the sixty minutes of an hour, and, therefore, a lesser number of combinations of six digits are actually employed than the full range of the decimay system would provide. Hence, the three tens digits of the day, hour and minute are combined and translated into a two-digit code so that the original six digits are compressed into a new code of five digits.

A feature of the invention is a translator which will combine and translate the tens digits of three two-digit numbers into a two-digit code and then combine this with the three units digits of the said three numbers to express in five digits the combination of three two-digit numbers.

From a purely mathematical standpoint, there are one thousand combinations of three digits, that is, 10×10×10. but here there are only seventy-two needed, that is, 3×4×6. Therefore, the seventy-two needed combinations may be obtained by using any one of eight choices in the first place and any one of nine choices in the second place, that is 8×9=72.

From a practical standpoint the translator will form the start time line in accordance with the following table:

| Tape Code Digit | Line Index | Combination of Day Tens and Minutes Tens | | | | Combination of Hour Tens and Minutes Tens | | | Day Units | Hour Units | Minute Units |
|---|---|---|---|---|---|---|---|---|---|---|---|
| | A | B | | | | C | | | D | E | F |
| Start Time Line | 0 | | | | | | | | | | |
| Minutes Tens 0 | | 0 | 1 | 2 | 3 | 0 | 1 | 2 | | | |
| Minutes Tens 1 | | 0 | 1 | 2 | 3 | 3 | 4 | 5 | | | |
| Minutes Tens 2 | | 0 | 1 | 2 | 3 | 6 | 7 | 8 | | | |
| Minutes Tens 3 | | 5 | 6 | 7 | 8 | 0 | 1 | 2 | | | |
| Minutes Tens 4 | | 5 | 6 | 7 | 8 | 3 | 4 | 5 | | | |
| Minutes Tens 5 | | 5 | 6 | 7 | 8 | 6 | 7 | 8 | | | |
| | | 0 | 1 | 2 | 3 | 0 | 1 | 2 | | | |
| | | Day Tens | | | | Hour Tens | | | | | |

By way of example, if a call had been started on the 15th of the month at 12:35 the start time line would then be filled out to read 0 6 1 5 2 5.

Again from a practical standpoint, this line forming translation is employed in order to condense scattered information into a short form to be carried through several other processing stages before the final bill is derived and printed. The computer is the device which collects such scattered items of information, performs certain calculations and generally translates the collected items into the order in which the charges will be presented to the customer. Since further processing, such as various kinds of sorting must be performed, this start time line is formed as one of the functions of the computer.

Another feature of the invention may then be stated as the combination is a computer of an automatic accounting system of means for gathering information of both general and specific nature from various sources translating such information into a coded form and forming a new item of specific information for each customer charge. Still another feature is a translator which will produce a code from partially translated and from partially untranslated information gathered from a plurality of sources.

Still another feature of the invention may be stated as a register for receiving and storing a representation of a plurality of two-digit numbers having fewer denominational orders than the total number of digits in said numbers. For setting said register there are employed a set of relays for each said number selectively responsive to the tens digits thereof, the relays of a first and a third of said sets of relays controlling a circuit network to fill a second denominational order (the first denominational order is reserved for control purposes) of said register and the relays of a second and third of said sets of relays controlling another circuit network to fill a third denominational order of said registers. The fourth, fifth and sixth denominational orders of said register are then filled with the units digits (without alteration) of the first, second and third of said numbers, respectively.

For purposes of economy the "charge time line register" in commercial practice contains only means for registering the second to the sixth denominational order digits since the first order digit remains invariable and when this line is to be perforated may be obtained from the TM (time) pattern relay.

In the device for recording the items of information for deriving the customer charges it may sometimes occur that an initial entry of a call will be recorded just before a tape is cut and the answer time and later the disconnect time will be recorded on the beginning of a new tape. Where the elements of a call are thus divided, partly on one tape and partly on another such a message is known as a straddle and the elements are processed in a particular manner leading to the later assembly of the separated elements and the proper derivation of the charges therefrom. Such items are sorted or routed to a straddle tape. However, it may also happen that the said initial entry was not followed by an answer time entry because the called line was busy or did not answer. It is assumed, therefore, that if an initial entry is followed by a number of hour entries that this represents a "don't answer" call, for it is extremely unlikely that if no answer is obtained in over an hour that the call was a valid one. It is, therefore, treated as an abandoned call and is discarded.

Now when such a single item of information is followed by two or more hour entries, or rather when, as read in the computer, two or more consecutive hour entries are followed by an initial entry it is assumed that this represents a don't answer call and does not constitute one of the elements of a straddle call. Hence, means are provided in the hour circuit to count the number of consecutive hour entries which may occur before an isolated initial entry and if the number counter is two or more, the following initial entry is discarded, and is not treated as part of a valid or a straddle call.

A feature of the invention is, therefore, means to discriminate between a record which might represent either a valid call which will have to be further processed or an invalid call which will have to be discarded. This feature consists of means for registering certain entries made on the record tape subsequent to the entry in question and for thereupon and in response to the said entries either routing the said entry in question to a special new record or discarding such entry.

In accordance with this feature an hour entry counting means is provided which functions within the computation of each charge or call. In normal calls the number of hours which elapse between answer time and disconnect time becomes a factor in the calculation of elapsed time, but in this special case the exact elapsed time is of no interest other than to indicate that the call is valid or not within the realms of probability. Hence, the hour counting circuit is enabled and a signal circuit is prepared which will be completed if the hour count goes to two or over.

A feature of the invention may, therefore, be stated as the use of the hour counting circuit for producing a discrimination between valid and invalid calls and means responsive to an hour count beyond a given figure for discarding calls as invalid.

Another feature of the invention is the use of a plurality of pattern relays. It has been pointed out hereinbefore that certain items of general information are registered in the computer and are used thereby in the processing of a plurality of customer charges and that certain items of specific information are registered and used for each separate customer charge. The pattern of the output of the computer varies in accordance with factors from both sources of information. For instance, simple message unit calls are in two forms, first, a single line output (Example No. 1) where the number of message units calculated can be expressed in one digit and second, a two-line output (Example No. 2) where the number of message units calculated can only be expressed in two digits. If the number of message units calculated requires more than two digits or the elapsed time calculated becomes more than 99 minutes (either of which rarely occurs) then the output is diverted to the straddle tape and a longer form of output is formed through the operation of certain of these pattern relays. For instance, in Example No. 5 where the elapsed time figured to be less than 99 minutes and the number of message units was also less than 99 message units the output became:

```
235444
000027
```

Let us now assume the elapsed time to have been longer. This can be illustrated by inserting another hour entry, as follows:

```
101657
281021
281020
281019
156257
213057
005444
```

Whereupon the output of the computer is perforated on the straddle tape as follows:

```
241857
071522
001615
019562
000001
231857
091519
005444
003001
```

This actually comprises two groups of items of information which will be deciphered by the clerk in charge of preparing charges as follows. The calling line 5444  (last four digits of line 8)
in office  0  (second digit of line 8)

in a marker group identified in the tape identity information common to the particular tape being scrutinized and which, therefore, may be identified by the clerk as office MArvel 4 made a call on

August  (in tape identity information)
  15th  (third and fourth digits of line 7)
at  7.56 p. m.  (hour 19 — second and third digits of line 4—minutes — fourth and fifth digits of line 4)

which consumed

+ 01.6  (second, third and fourth digits of line 3)
  +180.0  (3 hour entries)
  − 56.2  (fourth, fifth, sixth digits of line 4)

elapsed time  125.4  minutes

In other words:

10.016 p. m.  disconnect time
  7.562 p. m.  answer time 2.054 hours  elapsed time The computer then is provided with a plurality of pattern relays each of which responds to certain given conditions derived from the items of specific and items of general information entered into the computer during the processing of any one call and which in turn determine and control the form and composition of the output. All the information forming the composition of the output is, of course, derived from information entered into the computer.

A feature of the invention may then be stated as a plurality of pattern controlling relays responsive to information entered therein for controlling the information issued therefrom and the form of such issued information. Another feature may be described as the use of pattern relays which are responsive in some cases directly to indices in the entered information, in other cases to signals derived from information entered in the computer and in still other cases to a combination of the two.

More specifically, there is provided, an output class register the relays of which are selectively operated generally in accordance with information entered in the computer and specifically either in accordance with indices included in the entries or in accordance with conditions derived by the computer. Each relay of this register will determine the number of lines to be used in the output and will control the particular pattern relays, one for each line, to be employed and the sequence in which they are to be used.

By way of example and in illustration of the specific embodiment of the invention herein disclosed, in Example No. 1, a relay BK1 in the so-called output class register will be operated in response to the settings of the input class register and will control the operation of a pattern relay DN to form the one-line output.

125444

In Example No. 2, a relay BK2 in the so-called output class register will be operated in response to the settings of the input class register and will control in sequence the operations of the pattern relays DN and TMU to form the two-line output:

```
201234
000012
```

In the example above discussed (over two hours elapsed time), a relay 2TE and thereafter a relay IMU in the so-called output class register will be operated in response to the settings of the input class register. The relay 2TE will control in sequence the operation of the pattern relays TN, LTD, T, TMA and TB to form the five-line output:

```
241857
071522
001615
019562
000001
```

Immediately upon the conclusion of this operation the relay IMU will be operated and this will control in sequence the operation of the pattern relays TN, LTA, DN and ITB to form the four-line output:

```
231857
091519
005444
003001
```

A feature of the invention may, therefore, be stated as a combination of an input class register responsive to information entered into the computer, in some cases modified by the result of calculations therein, an output class register responsive thereto, and a plurality of pattern relays selectively and sequentially operated by said output class register to form the separate lines of the output, the said output class register controlling the number of lines in the output and each pattern relay forming one line thereof.

Another feature of the invention is a monitoring and control circuit for constantly checking and evaluating all entries of an assembled group of items of information and for controlling the proper disposal thereof. This is popularly known as the straddle circuit since the more spectacular results of its operation are the disposition of items of information for a call in progress when a change in recorders is made or when a record tape is cut so that some items appear on one record and the remainder on another, and the call is thus said to straddle two tapes. However, the function of this circuit is much broader and more comprehensive than its name implies for it exercises a complete supervision and control over every call, the regular as well as the special and the irregular calls.

The elements of the straddle circuit reside in a plurality of functional circuits which separately determine various factors of each call and which cooperate to provide the proper disposition of a call.

There is, first, a progress recording means which records in sequence the proper entry of the elements of a call and any items of information constituting irregularities. By way of example, one such irregularity is a cancellation entry known as the charge guard entry (285400) which was originally made automatically by a central office recorder when a trouble was detected by the recorder or transverter on one of its charge control leads. When such an entry occurs between an answer and a disconnect entry it casts doubt upon the validity of the disconnect entry and the validity of the elapsed time and it constitutes a signal to cancel charges on any overtime exhibited and to make the initial charge only. When such an entry occurs between the initial entry and the answer time entry it becomes a signal to cancel the entire call record. There is next an input class register which roughly classifies an incoming call and is a main determining factor in the output classification particularly where the call is regular. This device registers the incoming call primarily for purposes of distribution to various output circuits as a message unit call, a detail or toll call, a line observed call and so forth and secondarily for providing a basis for charging as a message unit local area call, a message unit extended area call and so forth.

There is, then, means provided for recognizing the termination of a call, that is, the complete entry of all items of information belonging to one call, whether the group be complete or not. If the group is complete and the call is regular it will be diverted to one of the tapes which is further processed to a customer's bill but if it is incomplete or irregular then it will be diverted to the straddle tape perforator and sufficient information will be reported so that an operator may make intelligent disposition thereof. There is in addition means for disposing of calls by routing information to the line observing tape and the message unit detail tape so that additional informational output tapes both for monitoring purposes and for customer use may be made.

If the group is incomplete, that is, in a specific case where the first item entered into the computer is an initial entry (no disconnect time and no answer time) the entry evidently represents a "don't answer" call and this is thereupon discarded and no record is made on any output tape.

There is a means for the evaluation of the cancellation signals mentioned hereinabove. The first element of the supervisory, monitoring or so-called straddle circuit was the means for checking the entries to make certain that all necessary information has been entered and that certain modifying information may also have been entered, including certain cancellation entries. The means now under discussion is a means responsive to such cancellation signals and which controls the straddle circuit and may affect the disposition of the call as well as the magnitude of the charge to be billed to the customer.

Next, there is an output classification means responsive primarily to the input class register but also under control of other elements of the circuit above described for determining the output channel into which a call shall be diverted and this also includes the means for determining the type of sorting which shall be performed. For instance, the simple message unit calls may be distributed to ten different output tapes and the basis for sorting to these ten different output channels may be an office classification or the thousands digit or the units digit of the calling line numbers.

The output classification means also controls the type of sorting to be used, whether by office, by thousands or by units, although the actual sorting is controlled by other means. Also in the handling of detail calls, there are six output channels provided for a sorting operation. Since records are handled on a basis of "rounds," and since a round may include as many as or less than six days the output classification means again also controls the type of sorting and, therefore, the number of these six output channels to be used, although the actual sorting into the six channels (if the output classification determines that all six are to be used) is controlled by other means.

There is a means closely associated with and under control of the output classification means for controlling the form or composition of the output entries in accordance with the specific description hereinabove of the control of the pattern relays. This means controls the number of lines of an output entry as well as the selection of and the sequence of the use of the pattern relays.

One of the important functions of the so-called straddle circuit is to recognize the occurrence of some condition which might lead to the diversion of information to a straddle tape. By way of example, in the central office the recorder circuit is operated to prepare for ending a tape at about 3:00 a. m. This means that a tape end has the tape identity information and a plurality of splice pattern codes perforated therein so that the tape may be cut. However, unless the office is a very busy one so that a long tape is produced in a single twenty-four hour period the tape is not necessarily cut. In this case a call which straddles this operation becomes a genuine straddle call if the tape is cut but is complete and may be regular in every respect if the tape is not cut.

Hence, when this tape end preparation takes place a combination of codes is included which will set up a condition to produce a preliminary indication of a straddle call in each call existing and uncompleted at that time. The call being processed is, therefore, diverted to the straddle call outlet and the necessary information, which might have materially differed from that of a regular call, is recorded on the straddle tape.

There are several preliminary indication means each denoting a different condition and each requiring some different output classification. Since it is possible that the conditions giving rise to the registration of a particular one of these preliminary indication signals might be changed so that a different preliminary signal must be registered in lieu thereof, the registration means therefor are included in a displacement locking chain whereby any one upon operation will release any other which may previously have been operated and locked.

A feature of the invention may, therefore, be stated to be a monitoring or supervisory circuit responsive to a plurality of factors including indications in the specific items of information of a call, indications derived by the computer from the items of specific information and the items of general information and indications from items of general information alone, for controlling the form and disposition of the call processed by the computer. In more specific form this feature may be stated as a monitoring or supervisory means consisting of the combination of a progress recording means, an input class register, means for signaling the registration of a sufficient number of items to represent a call, means for evaluating certain trouble indications in relation to a call, and an output class register jointly controlled by said elements for controlling the form, the contents and the disposition of a call processed by the computer.

Another feature of the invention is a check circuit for insuring that a cancellation signal cannot be overlooked so that a customer cannot be overcharged. This takes the form of a duplicate path arrangement whereby a signal of general significance must coincide with a signal of specific significance before an operation may be started.

It may be explained that a cancellation signal is one which casts doubt on the validity of a timing interval which may be calculated by the computer. In the central office where the records of calls are originally made, in a device known as a district junctor a facility employed in the establishment of a telephone connection, means are provided to transfer to a recorder a record of the various operations therein. There may be a large number of these district junctors at any one time competing for the use of a recorder and the usual means for allowing these records to be made in sequence are provided. Therefore, when a district junctor is ready to record an item of information it seeks the use of a recorder and when access to the recorder has been made the record is transferred and thereafter the recorder signals back to the district junctor that such record has been made so that the recorder may then be released.

Now it may happen that the recorder has in some manner developed a trouble so that the maintenance force will place a make-busy signal thereon. In other words, they will render the recorder inaccessible to the various district junctors by an artificial busy signal which is removed as soon as the trouble has been cleared and the recorder can go back into service again. This means that a number of district junctors may cue up, so to speak, awaiting the use of the recorder and, therefore, the exact time at which the junctor may make a record of an operation therein will be delayed for an indefinite length of time. While in actual practice this indefinite length of time is extremely short, it is nevertheless indefinite. Therefore, if the make-busy signal is placed on the recorder during a conversation that is after the answer time has been recorded but before the disconnect time has been recorded, then it may happen that the disconnect time is actually delayed somewhat in being recorded. This would mean that the customer would be overcharged. In order to avoid any such overcharge a cancellation signal is, therefore, placed on the recorder tape whenever the recorder is made artificially busy and this cancellation signal (code 285600) will have the effect in the computer of causing the customer to be charged only for the initial period and to have all overtime cancelled, even though, in point of fact, the disconnect time may be properly recorded.

In one of the components of the straddle circuit there are, by way of example, two relays, one designated DK and the other designated DRK. The function of the DK relay is to record in the entry progress register the fact that a disconnect time has been registered followed by a cancellation signal and this is of specific significance, the DK relay responding particularly to the cancellation signal. The DRK relay merely records generally that a disconnect time has been registered and is, therefore, of general significance. Both of these relays must be used to operate the relay which checks for the proper registration of the entire sequence of the call in the straddle circuit (the STCI relay). This check circuit contains a number of parallel branches. In one of these, for instance, both the DK and the DRK relays must be operated or must both be unoperated, that is, the item of general significance must check with the item of specific signifiance. In another of these parallel circuits the item of general significance must again check with an item of specific significance in that the DRK and the S56 (the specific concellation signal) relays must either both be operated or both be released. Thus, the operation of the STCI start relay depends upon a check of these items of information, in a manner somewhat akin to the operations in double-entry bookkeeping. The same information placed in different categories must show the same end result. In this manner, it is made certain that a cancellation signal is not overlooked and a customer perhaps overcharged.

Other features will appear hereinafter.

The drawings consist of twenty-five sheets having thirty figures as follows:

Fig. 2 is a highly schematic showing of the basic switching circuit employed herein;

Fig. 3 is a block diagram showing how Figs. 4 to 13, inclusive, may be placed to form a more detailed but yet a schematic-like use of the elements of the present invention and in which:

Fig. 4 shows the reader and the reading relays by which the input tape is scanned;

Figure 5:
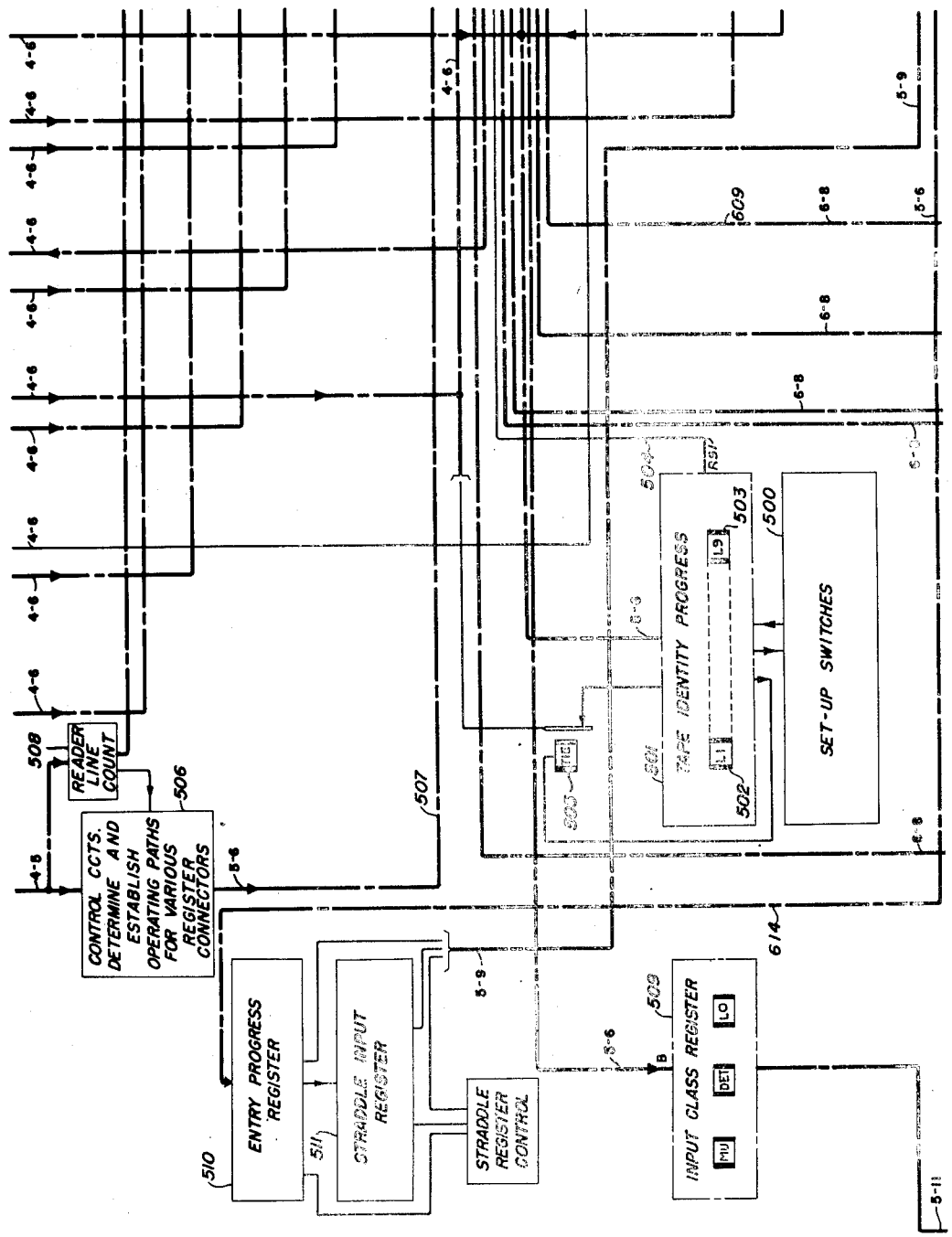
Figure 6:
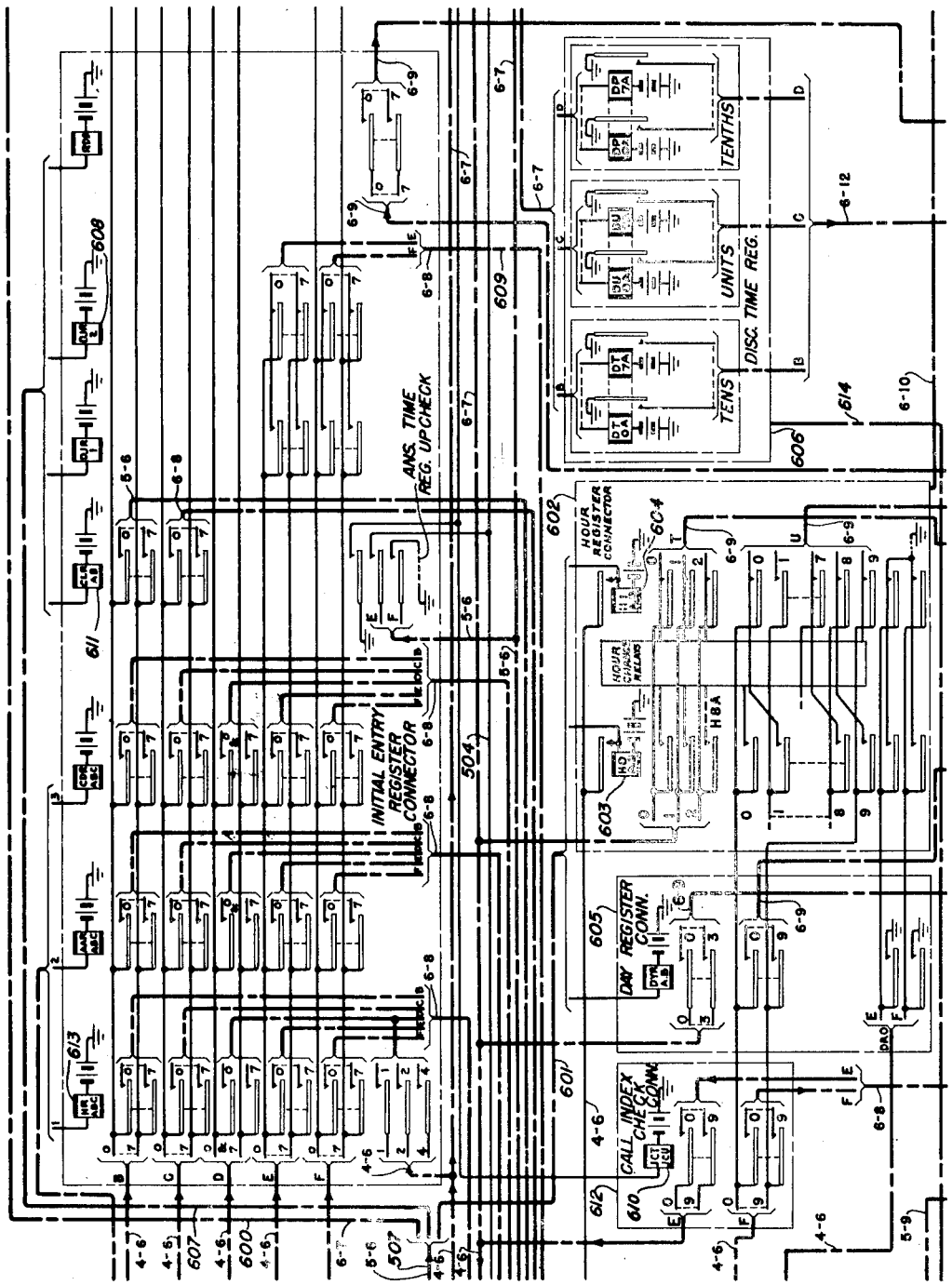
Figure 7:
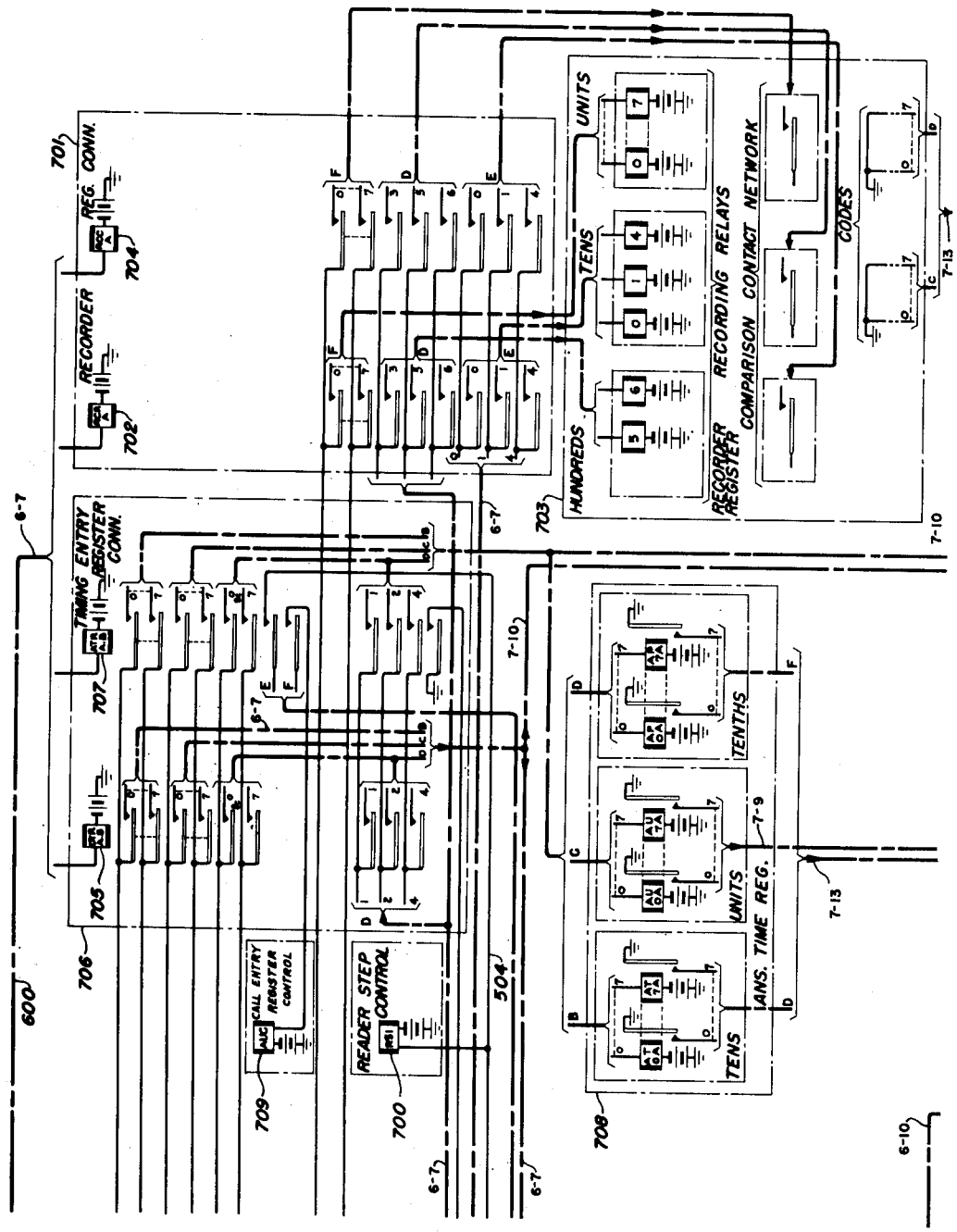
Figure 8:
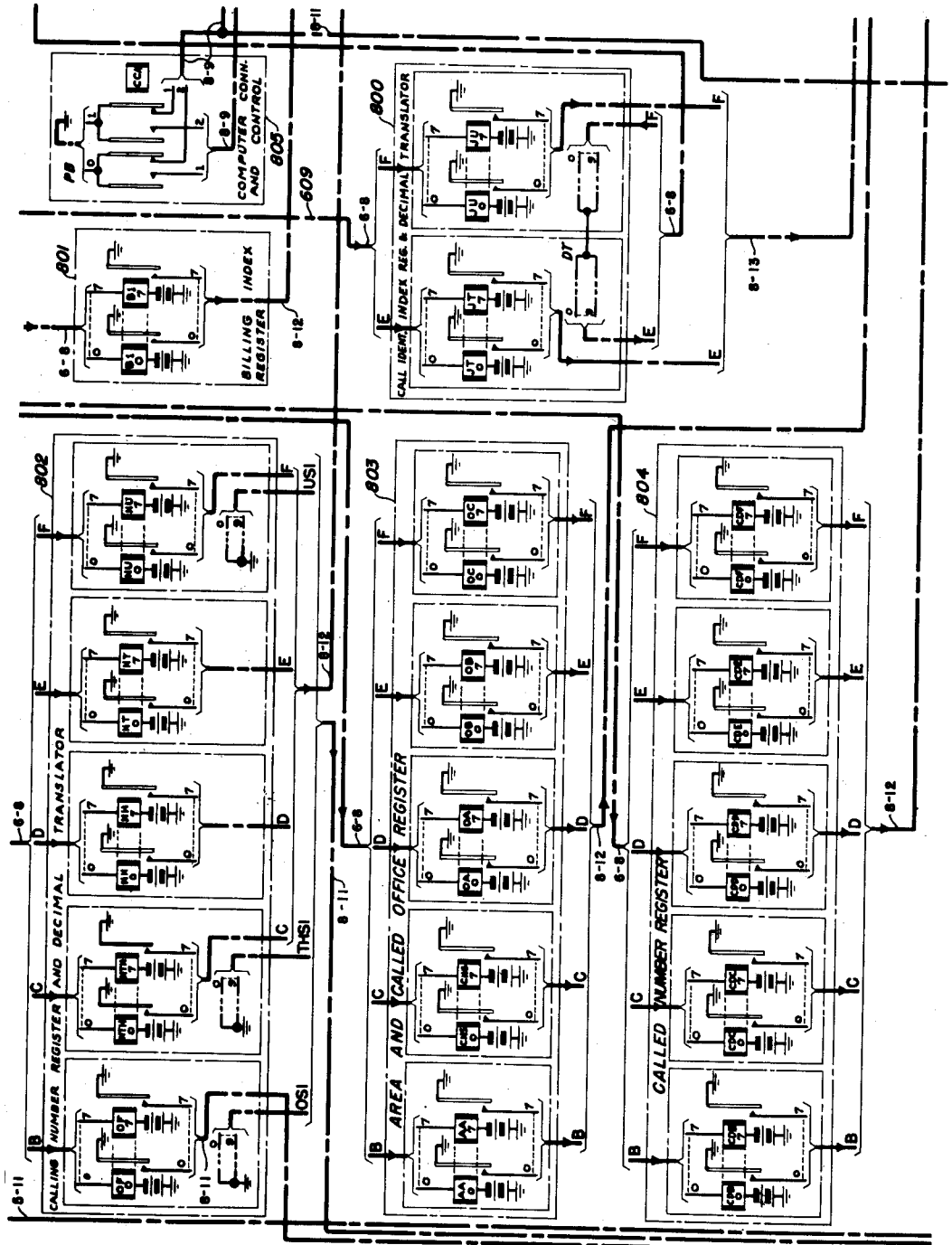
Figure 9:
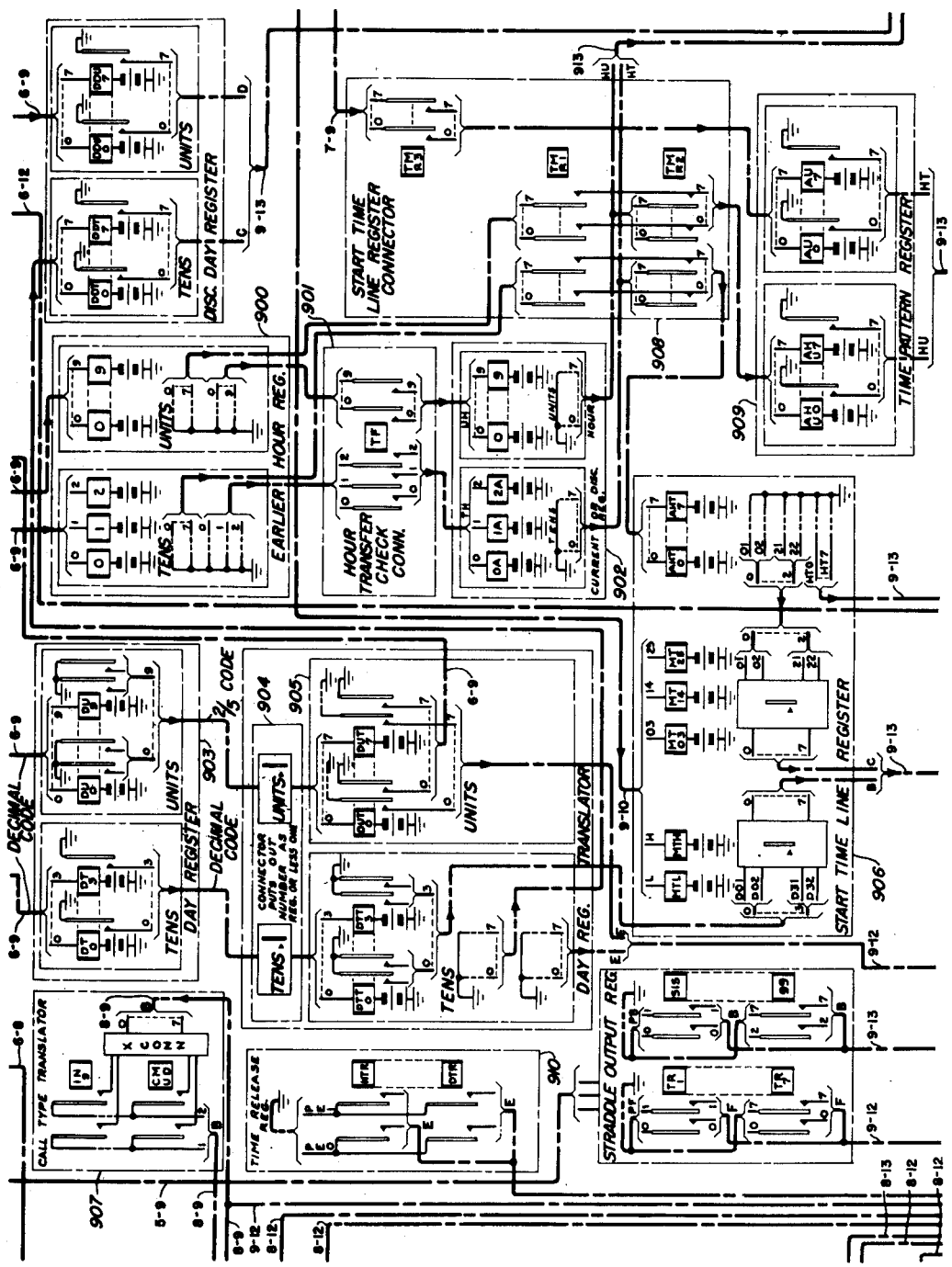
Figure 10:
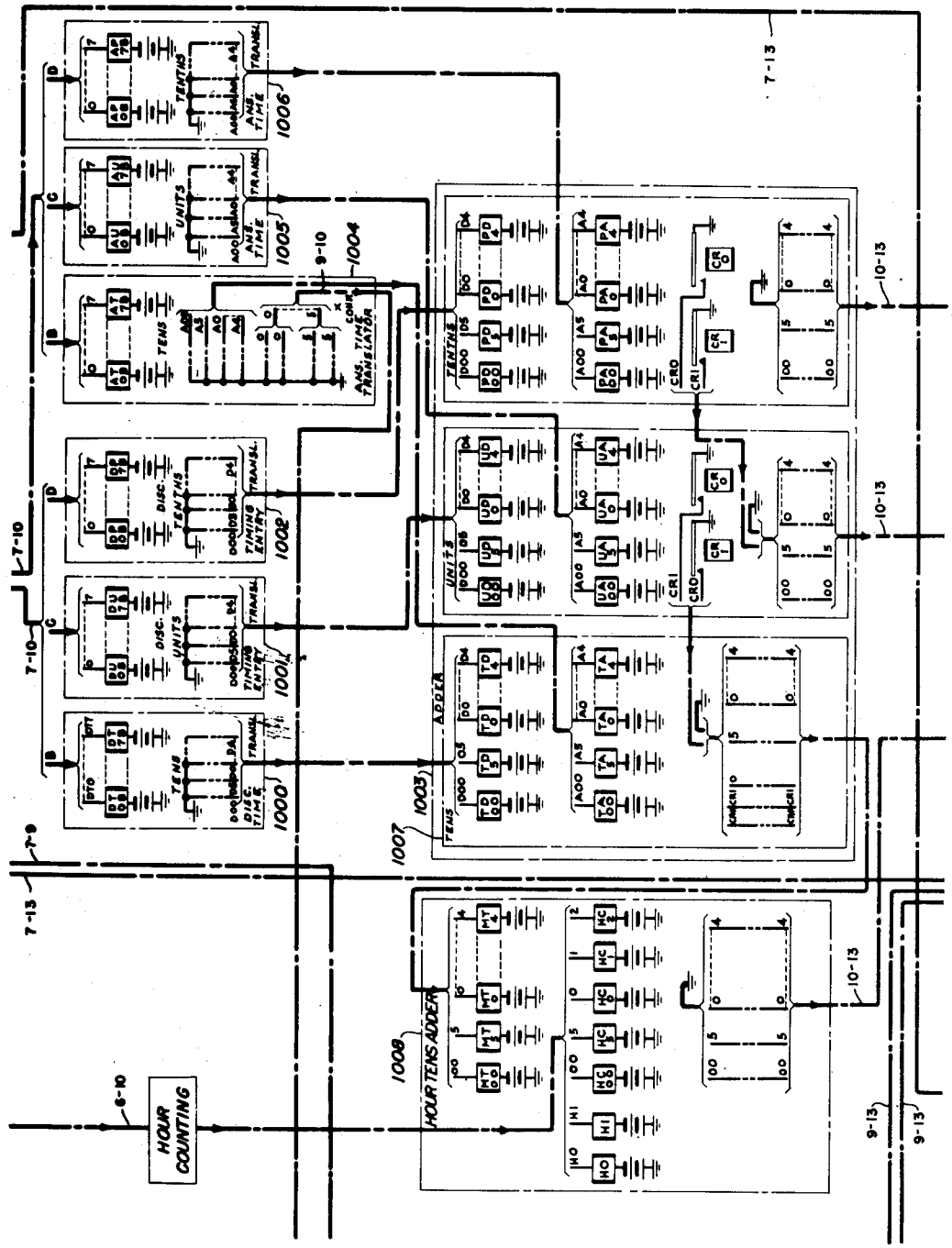
Figure 11:
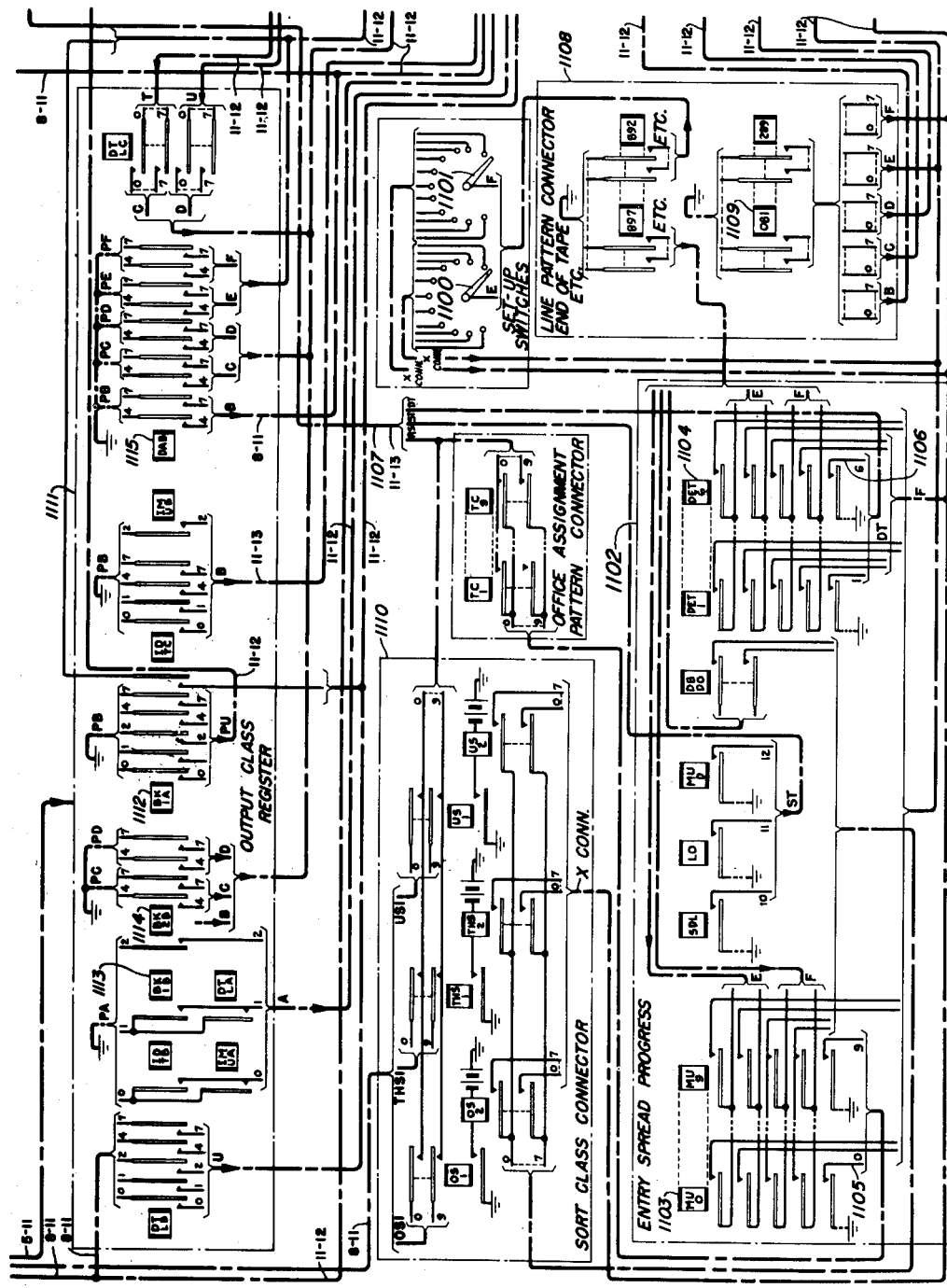
Figure 12:
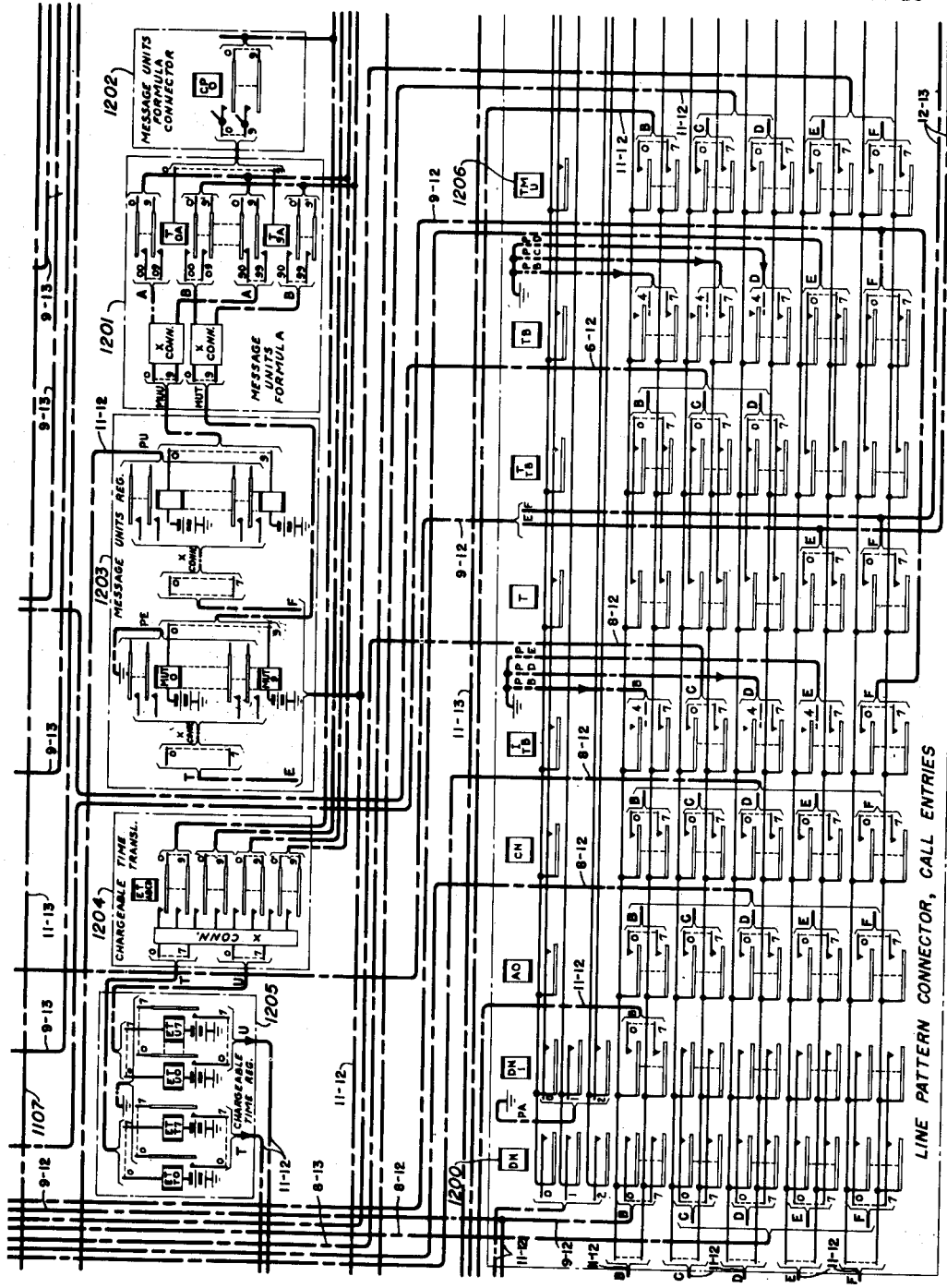
Figure 13:
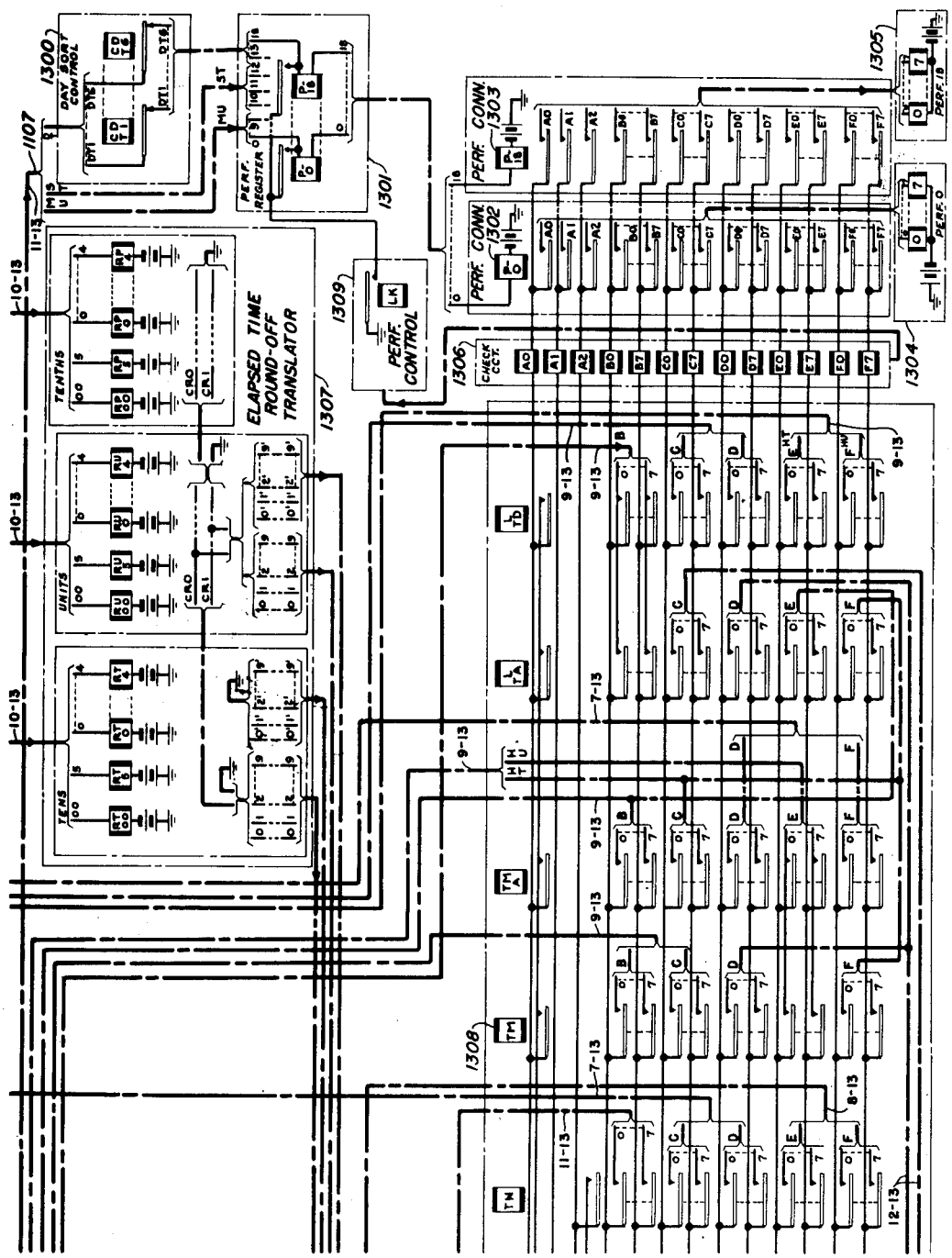
Figure 16:
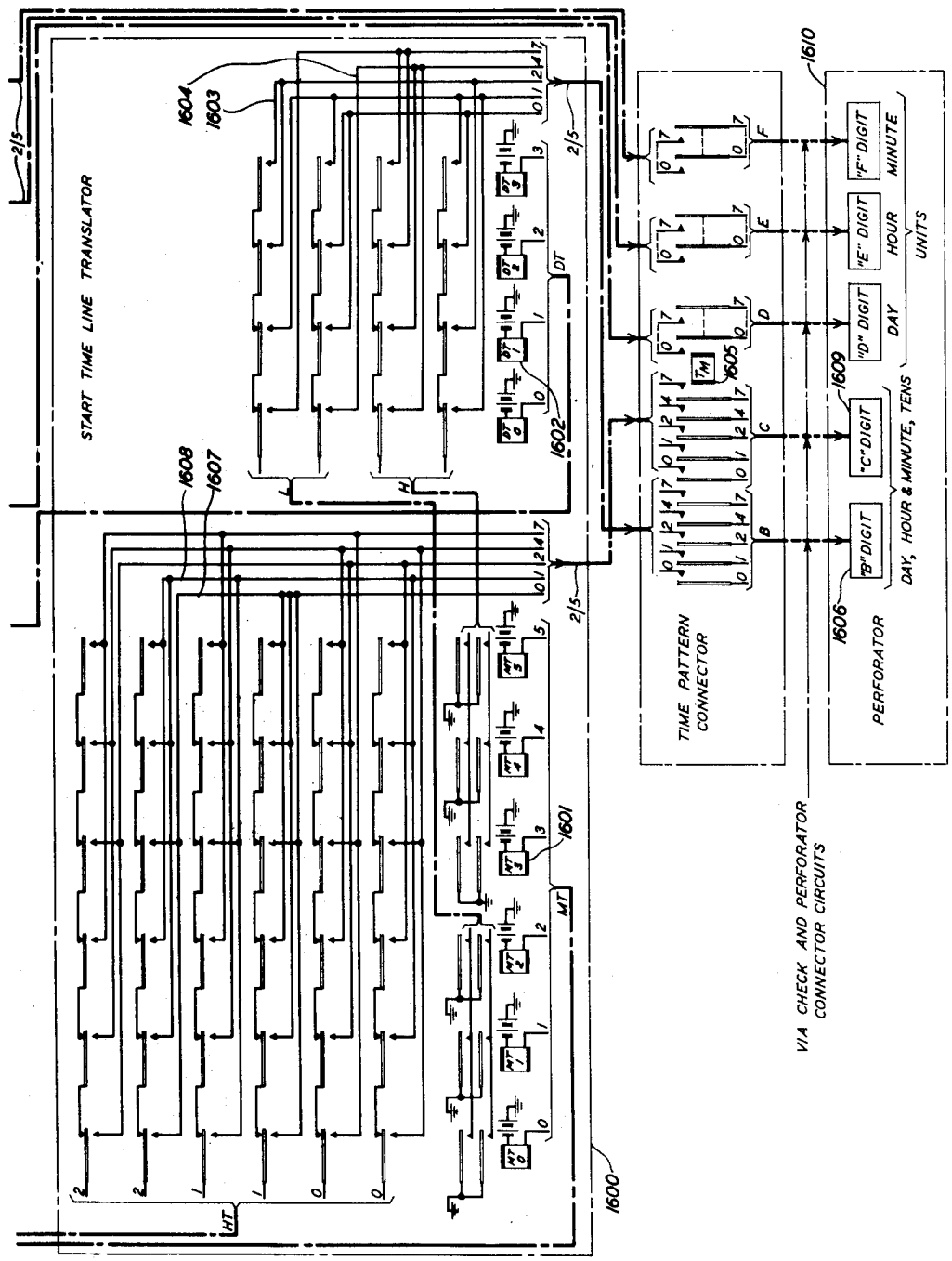
Figure 17:
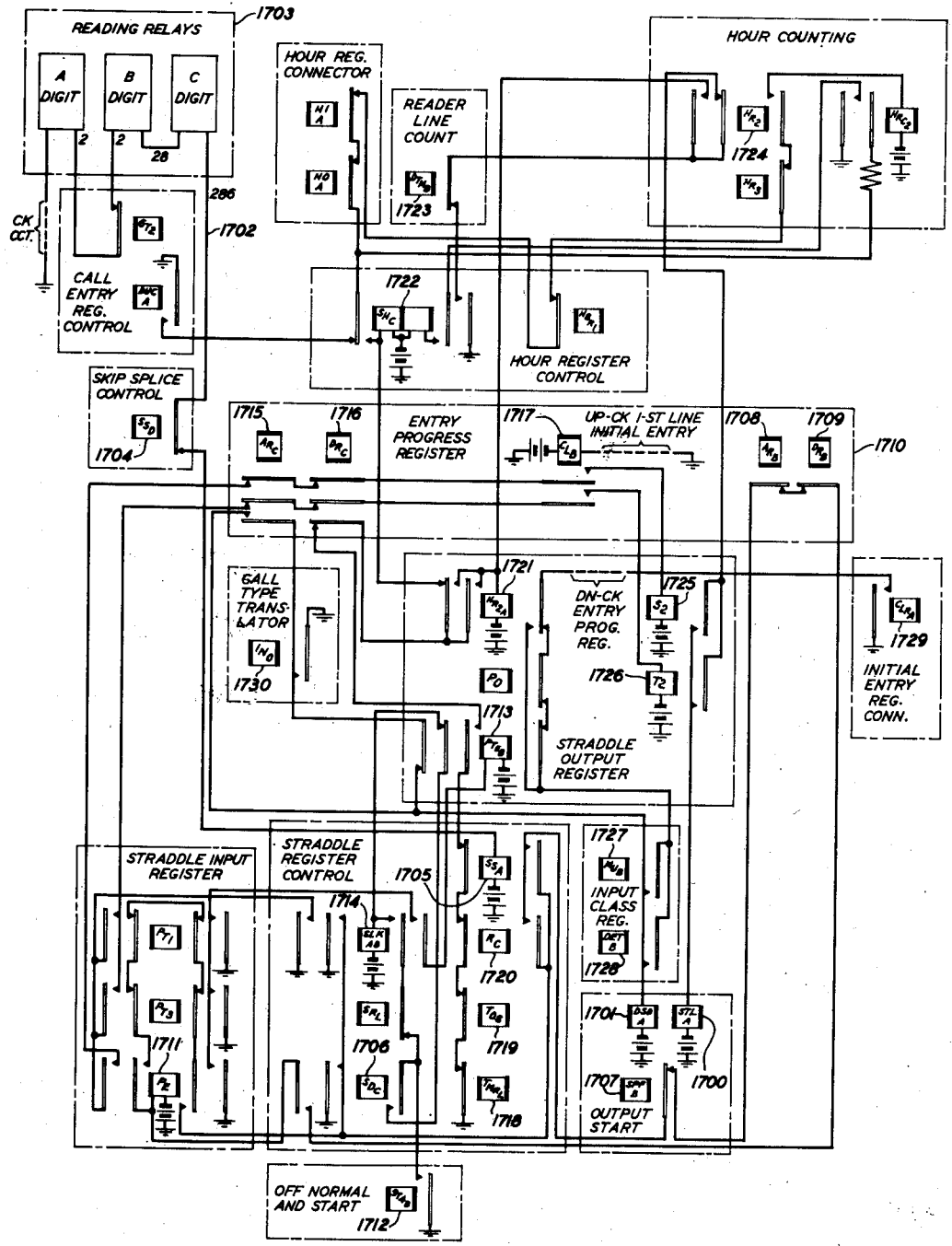
Figure 18:
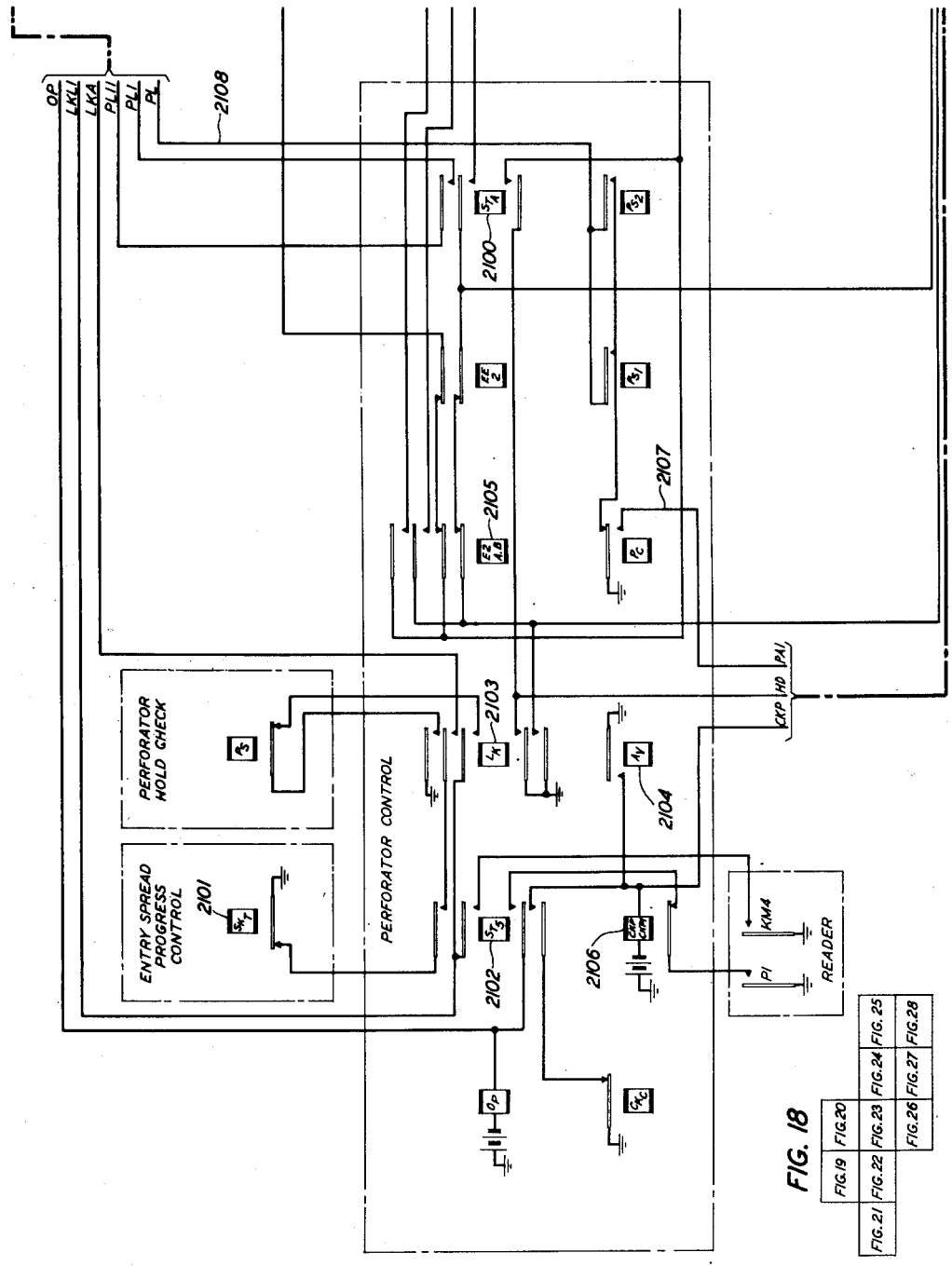
Figure 19:
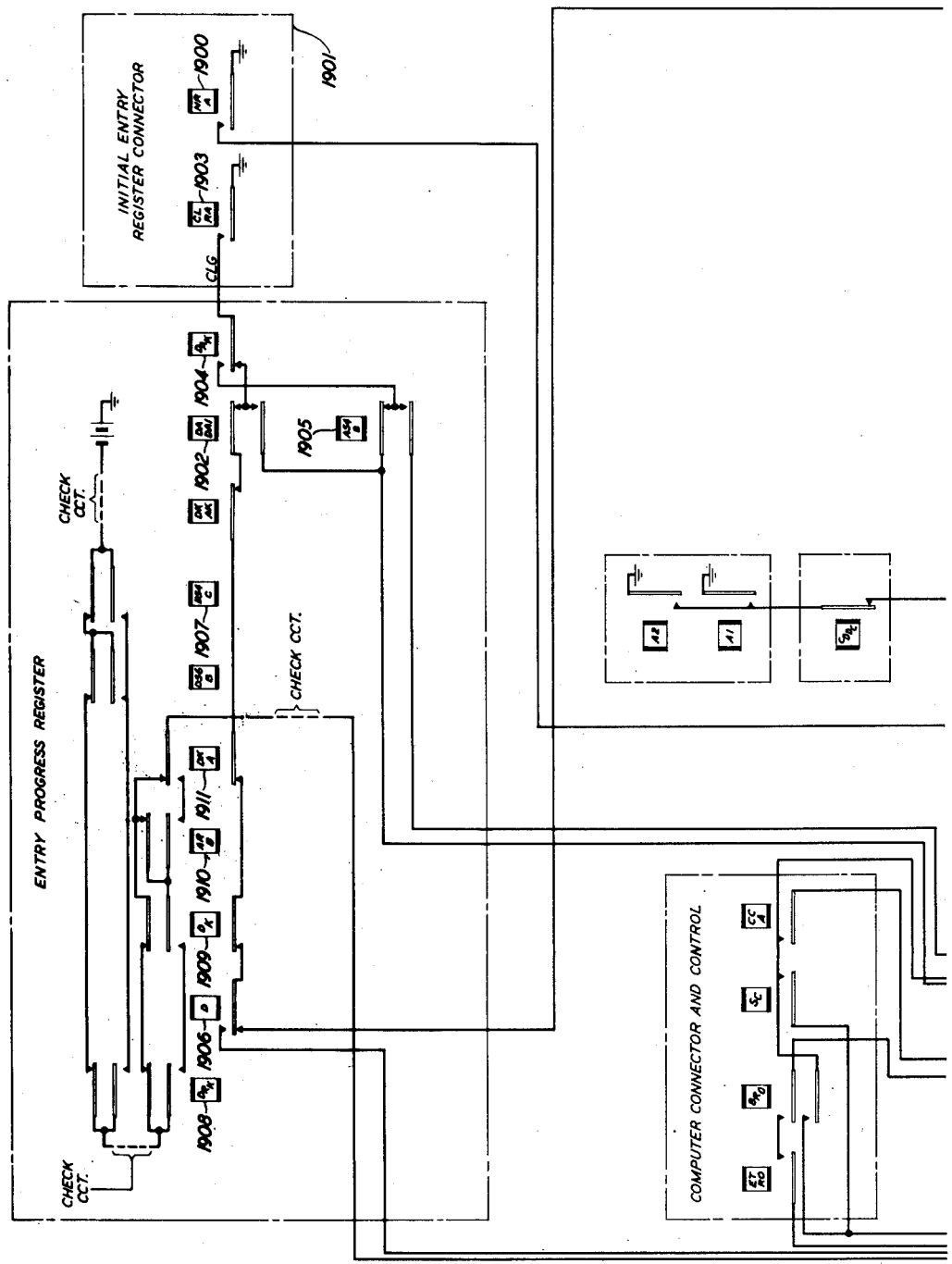
Figure 20:
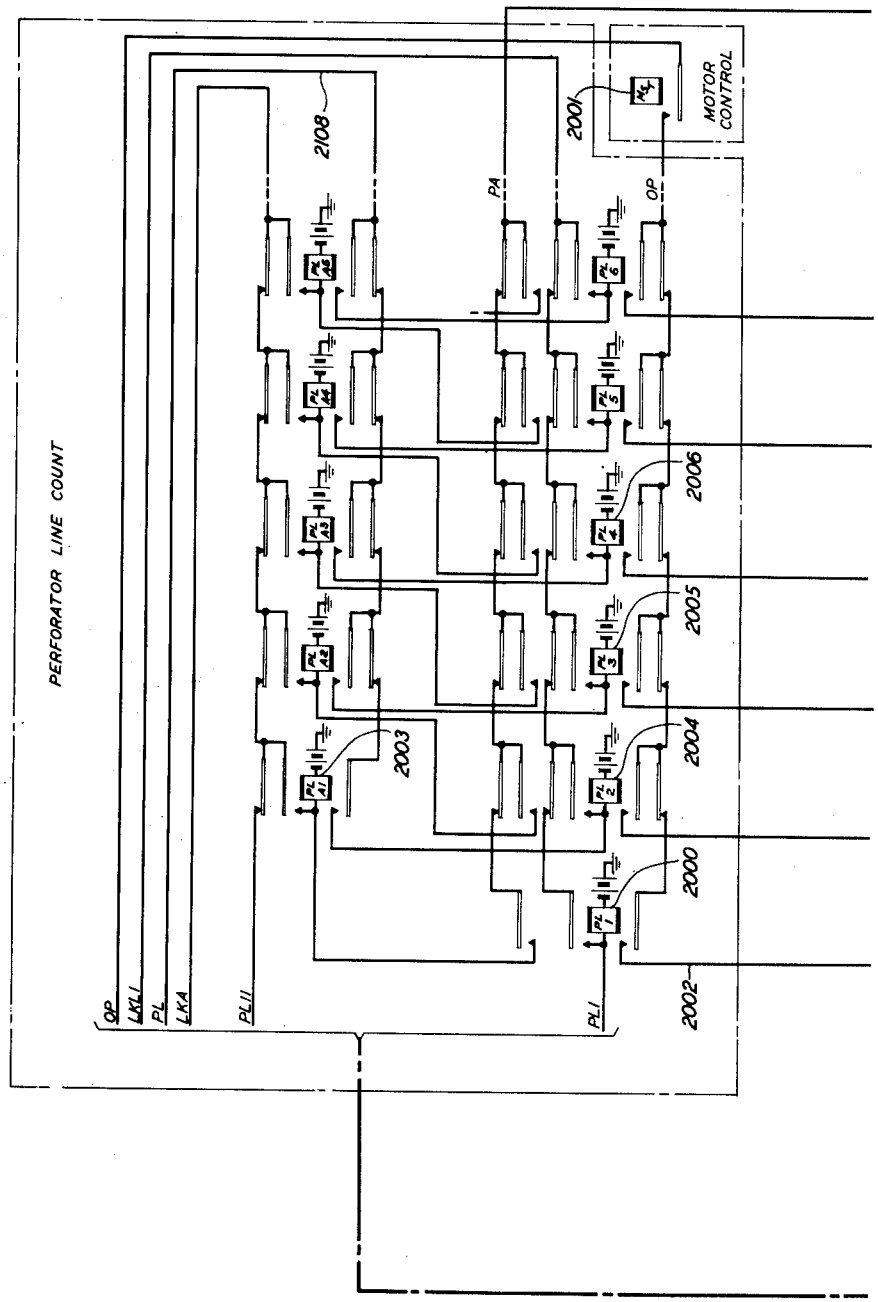
Figure 22:
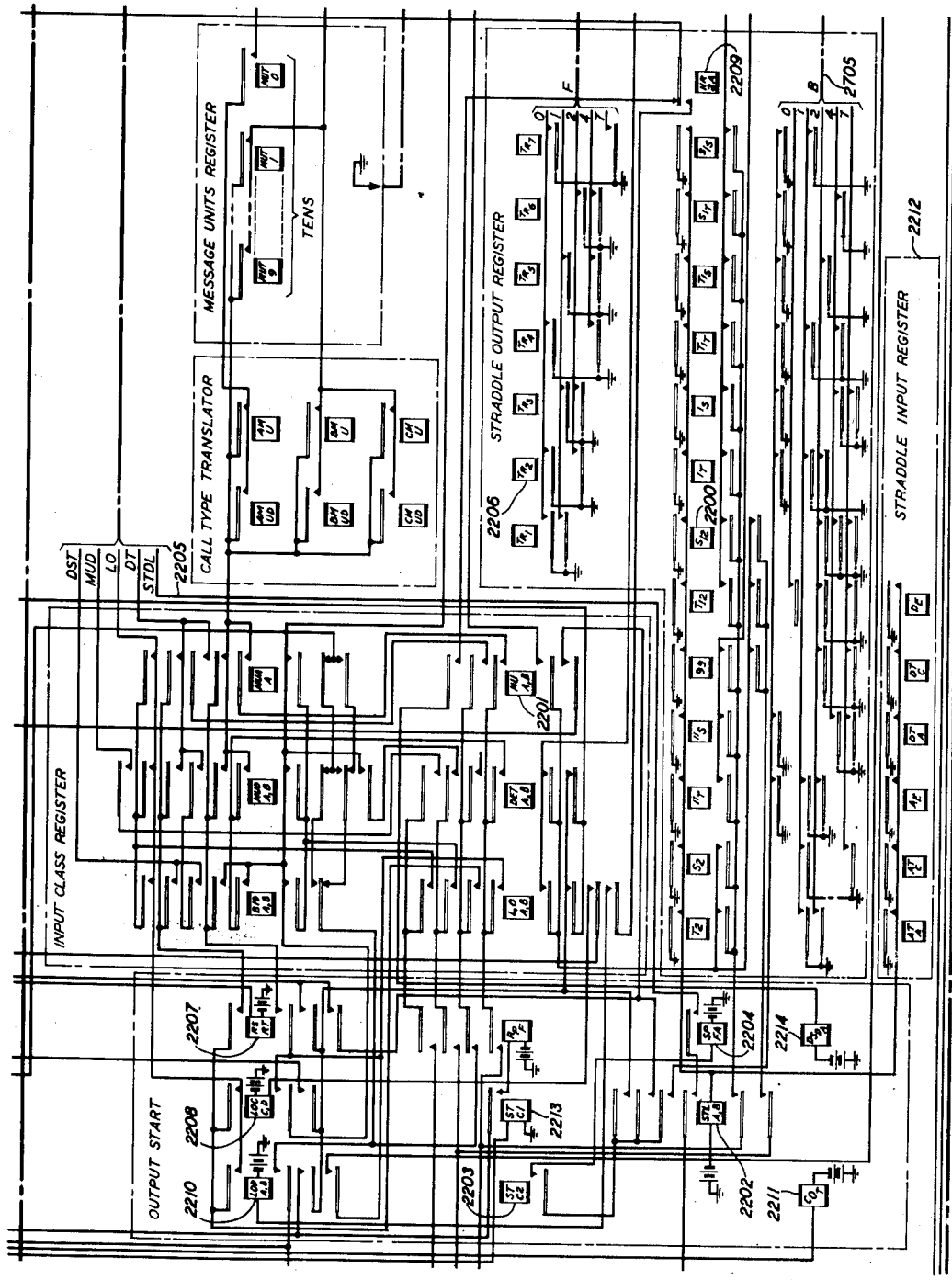
Figure 23:
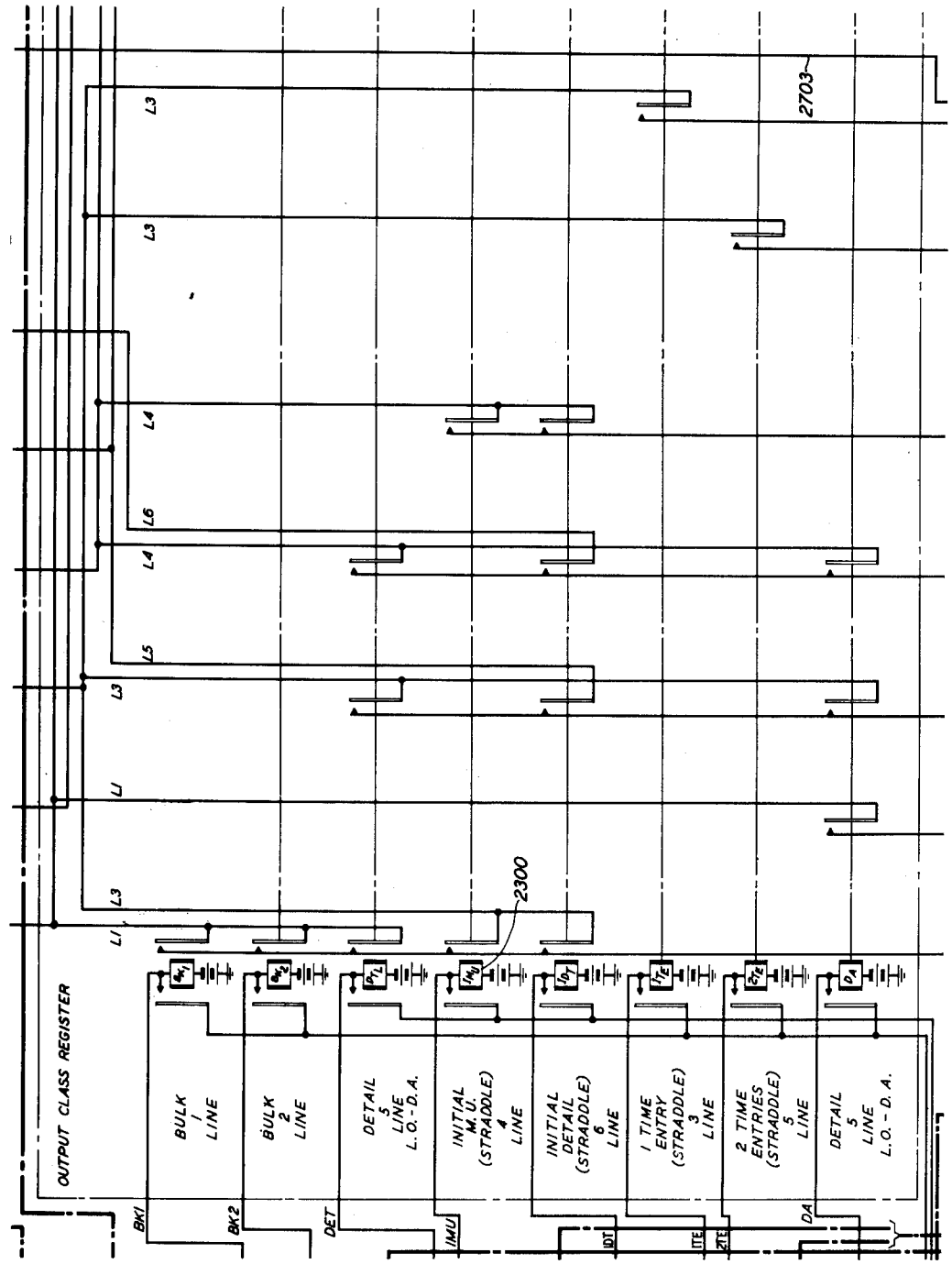
Figure 24:
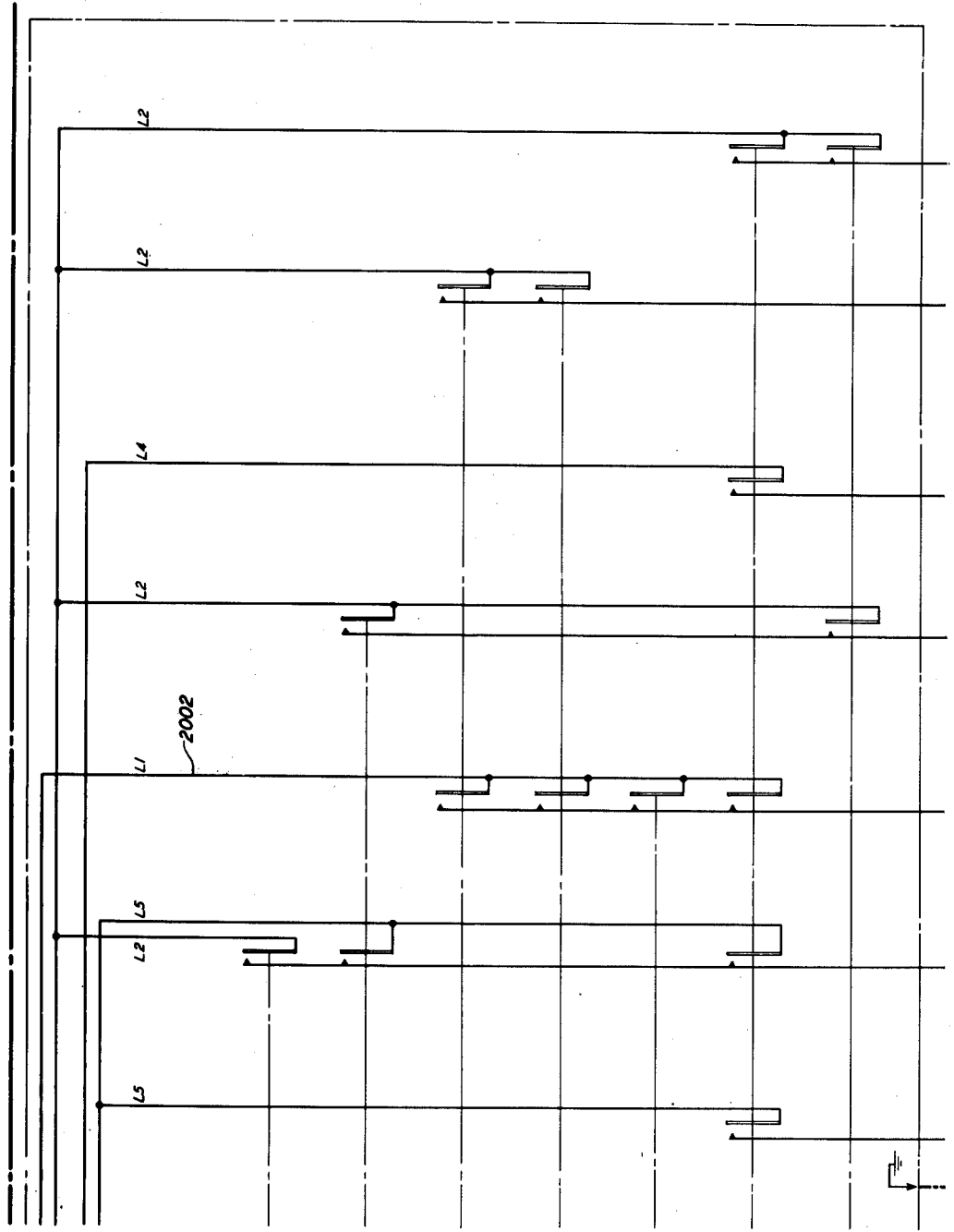
Figure 25:
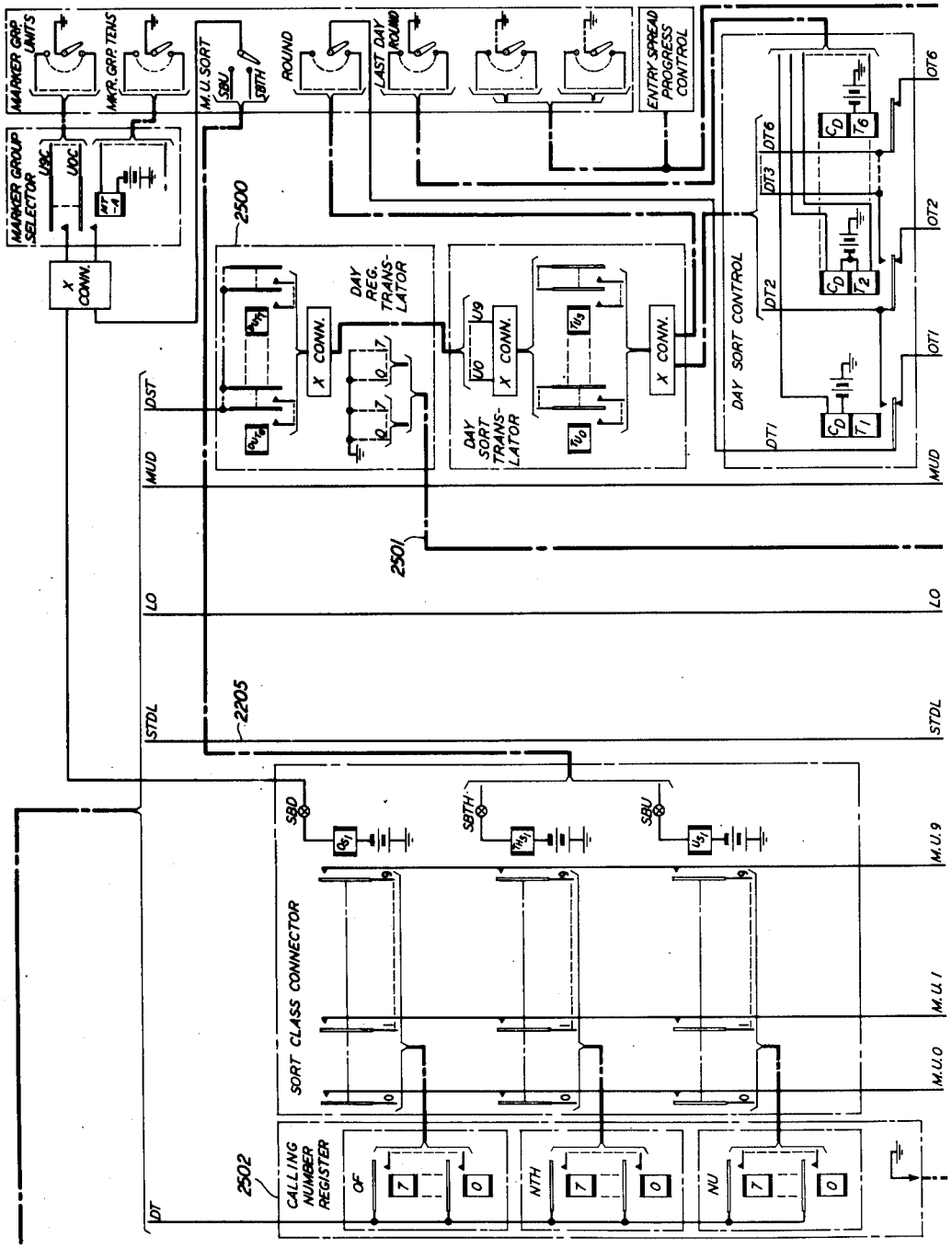
Figure 26:
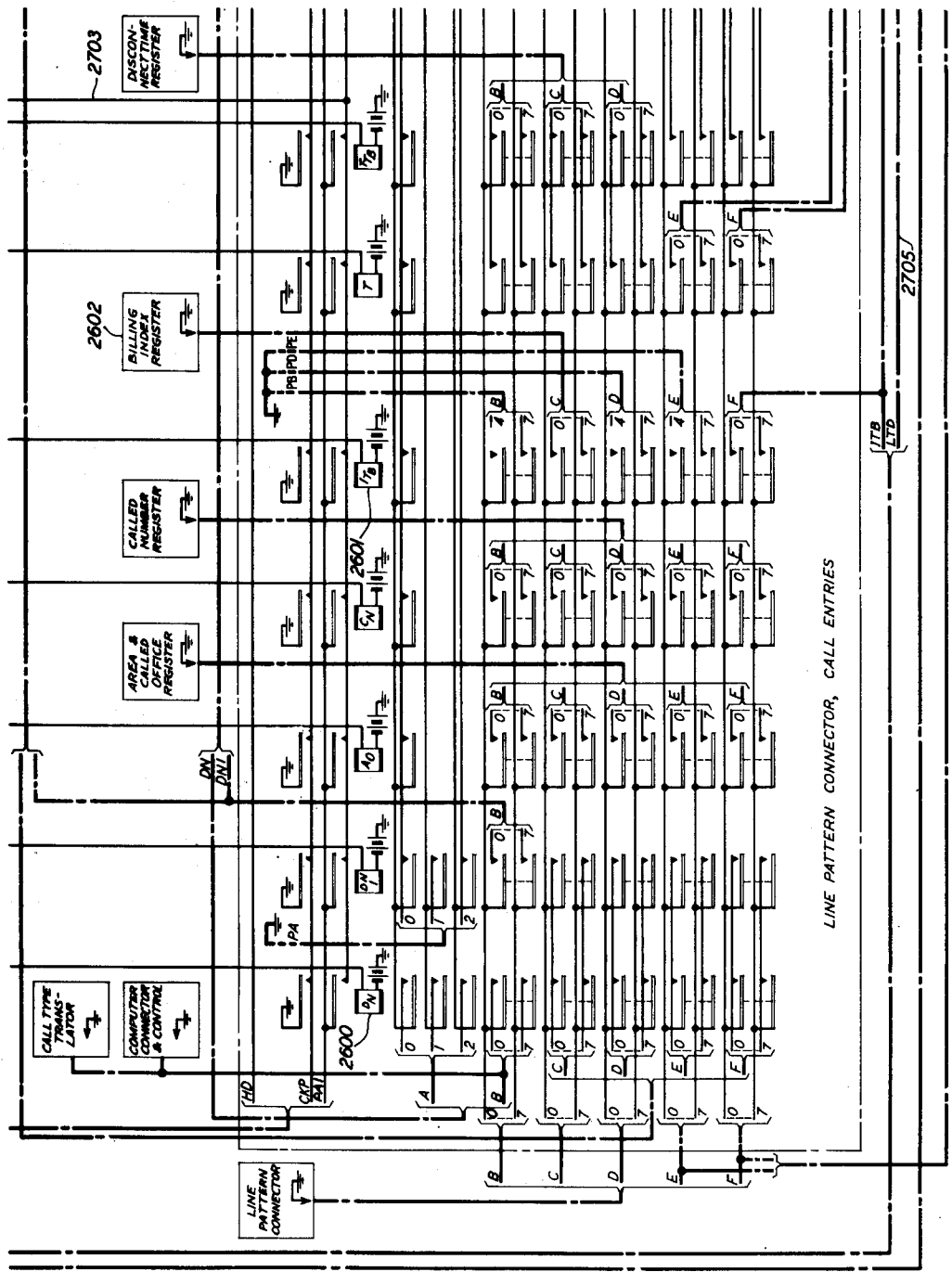
Figure 27:
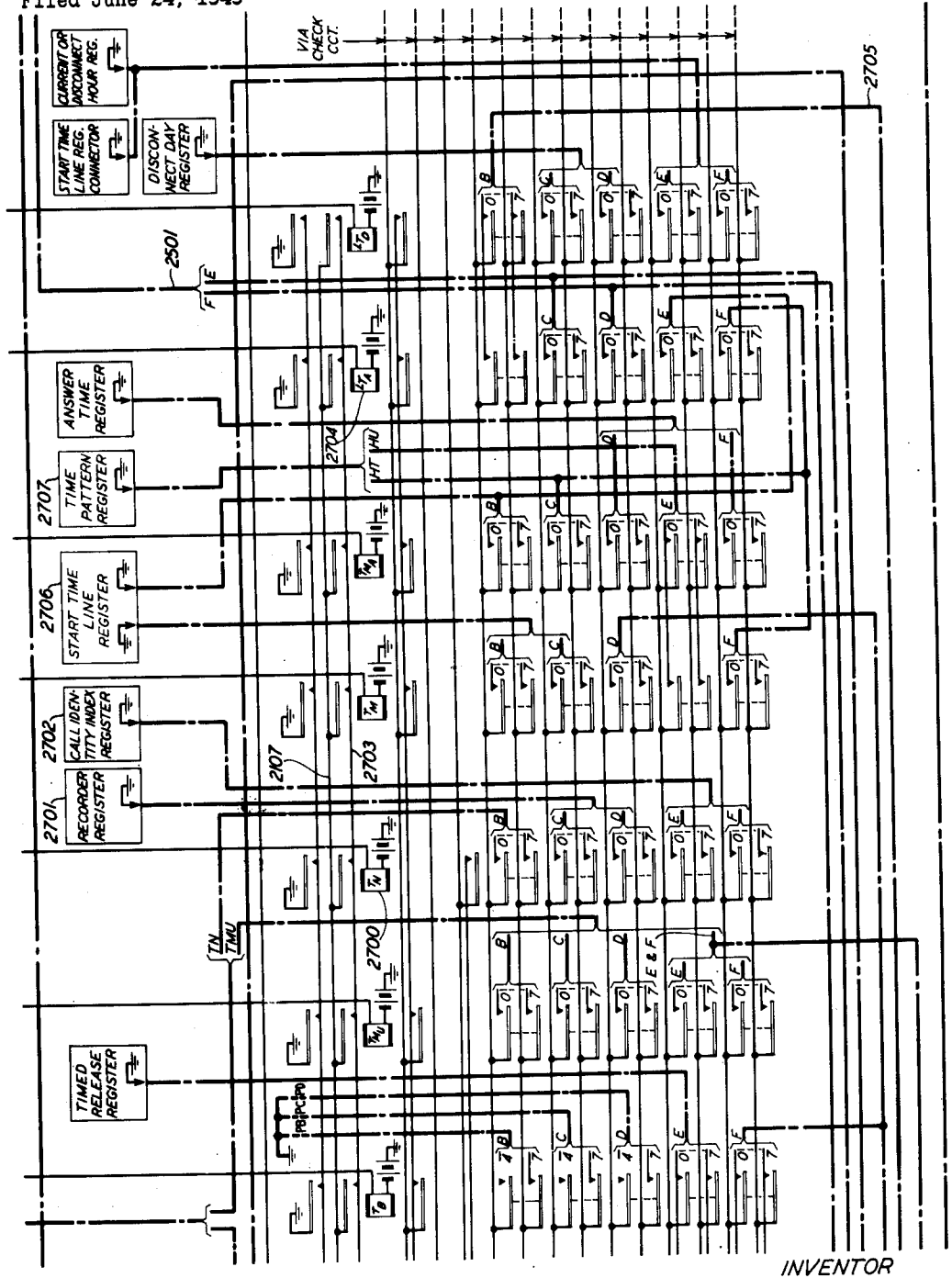
Figure 28:
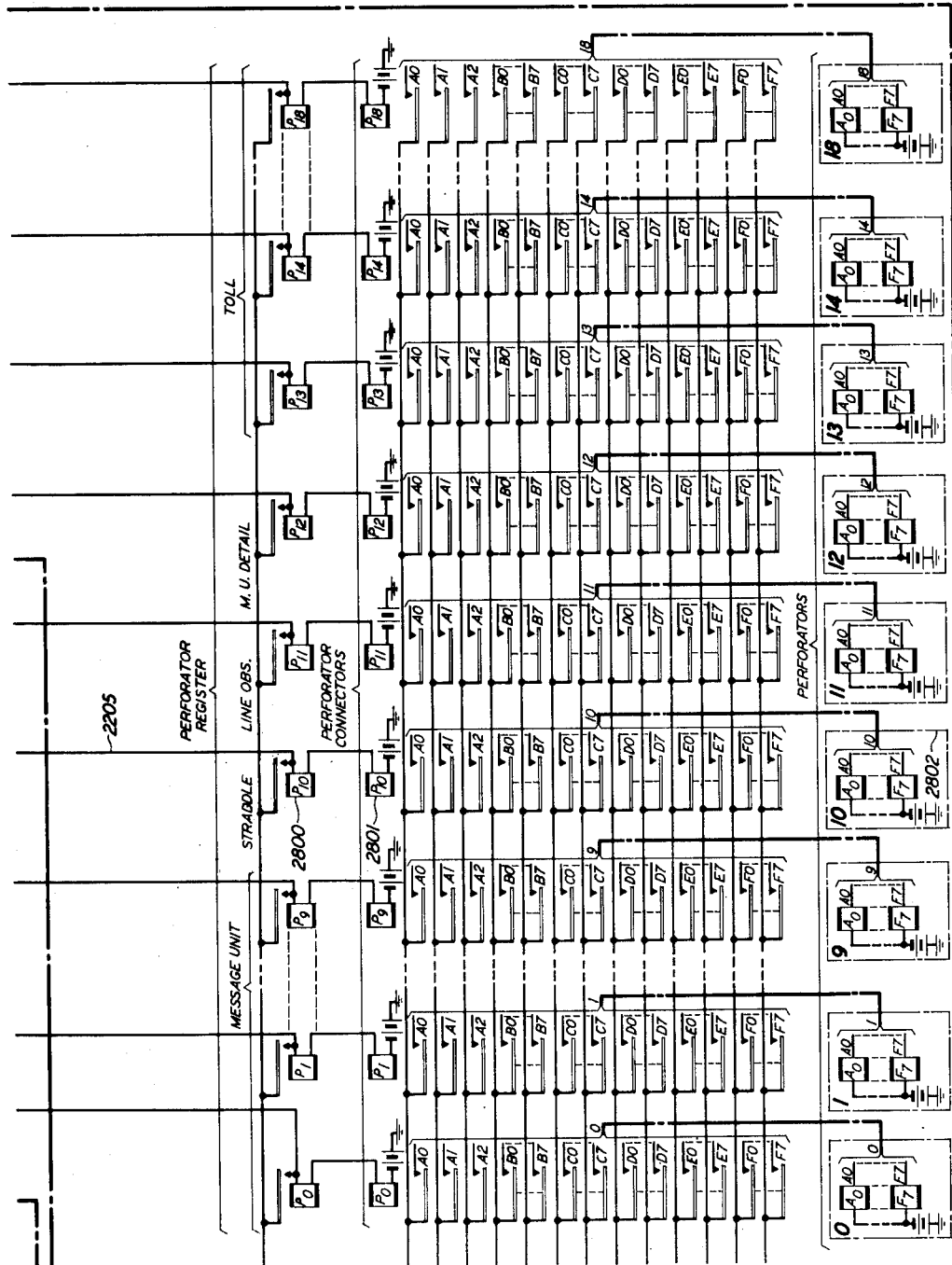

Fig. 5 indicates the location in the circuit arrangement of the reader line count means, the reading relay translator and the control circuits;

Fig. 6 shows a number of register connectors and indicates the disconnect time register;

Fig. 7 likewise shows a number of register connectors and indicates the answer time and the recorder register;

Fig. 8 shows the calling number register, the area and called office register, the called number register, the billing index register and the day and junctor register and decimal translator;

Fig. 9 shows the call type translator, the day register, the time release register, the day register translator, the straddle output register, the start time line register, the earlier hour register, the hour transfer check connector, the disconnect register, the disconnect day register, the start time line register connector and the time pattern register;

Fig. 10 shows the adder that part of the computer which performs the mathematical functions thereof;

Fig. 11 shows the output class register, the sort class connector, the entry spread progress circuit, the office assignment pattern connector, the set-up switches and the line pattern connector for the end of tape perforation;

Fig. 12 shows the chargeable time register, the chargeable time translator, the message units register, the message units formula device, the message units formula connector and the line pattern connector for call entries; and Fig. 13 shows the elapsed time translator, the day sort control, the perforator register, the perforator control, part of the line pattern connector for call entries, the check circuit therefor and indicates two of a plurality of perforator connectors and the associated perforators;

Fig. 14 is a block diagram showing how Figs. 15 and 16 may be placed to form a schematic circuit diagram illustrating the translating means whereby information normally expressed in six digits may be coded to be expressed in five digits;

Fig. 15 indicates the sources of information from which the six digits are taken; and Fig. 16 shows the actual translating contacts whereby three of the gathered six digits are combined into a two-digit code and the remaining three of the six gathered digits are added to the two-digit code to form a complete five-digit code;

Fig. 17 is a schematic circuit diagram showing in abbreviated form the means for discriminating between valid and invalid information;

Fig. 18 is a block diagram showing how Figs. 19 to 28, inclusive, may be placed to form a schematic circuit diagram illustrating (1) the use of pattern relays as a means for gleaning from various sources bits of information which are then combined and formed into output lines in response to indices entered into the computer or derived from information otherwise entered and (2) the essentials of the straddle circuit operating as a monitoring or supervisory circuit exercising control of the output either to discard information or to cause the reporting of complete details when any irregularity in the normal operation becomes apparent;

Fig. 19 indicates the entry progress register and certain of the connector controls;

Fig. 20 shows the perforator line count circuit by which the predetermined number of lines which must appear in the output are checked as they are perforated;

Fig. 21 shows the perforator control circuit;

Fig. 22 shows the output start circuit, the input class register, the straddle input register, the straddle output register, the call type translator, and the message unit register;

Figs. 23 and 24 show the output class register;

Fig. 25 shows the calling number register, the day register translator, the day sort translator, the day sort control, the marker group circuit and an indication of the entry spread circuit by means of which certain output lines which are common to all output tapes are caused to be perforated on each of the said output tapes;

Figs. 26, 27 and 28 show the various pattern relays; and

Fig. 28 also includes an indication of the perforators;

Fig. 29 is a verbatim printing of a straddle output tape; and

Fig. 30 shows the straddle page produced thereby.

In the following description the various relays are designated by both letters and numerals which have come to have certain significance to persons familiar with the technical details of the disclosed arrangements. By way of example, the reading relays are known as the A0, A1 and A2 relays for the first group thereof used to register the A digit of the six-digit line used in the automatic accounting system tapes. In the present case, there are three relays in the first or A set and five relays such as the B0, B1, B2, B4 and B7 relays in each of the remaining five sets. In a great many cases a relay will have only such an alphabetic designation but in other cases it will have in addition a numerical designation which always consists of the figure number plus two other digits, whereby the location of a piece of apparatus can be at once found by turning to the corresponding figure number. Where conductors are designated by numerals in addition to the usual alphabetic designation thereof the number used will be a combination including the figure number wherein the conductor is first picked up in the tracing of a circuit and this number will be retained even though the conductors extend through another large number of circuits. Another convention used herein for the sake of clarity is a numbering scheme for the cables or bundles of conductors which must be carried over long distances. This is the use of a hyphenated number such as 29-118 indicating that this cable or bundle of conductors extends between Fig. 29 and Fig. 118.

For obvious purposes, in certain cases, conductors will bear the same alphabetic designation as other apparatus. This is not to be taken as a duplication of the designation but will be readily understood that such a conductor bears an intimate relation to the other piece of apparatus.

Similar logical means for designating various elements of the circuits will be found in the drawings and are used as an aid to the clear understanding of the present arrangement.

Figure 1:
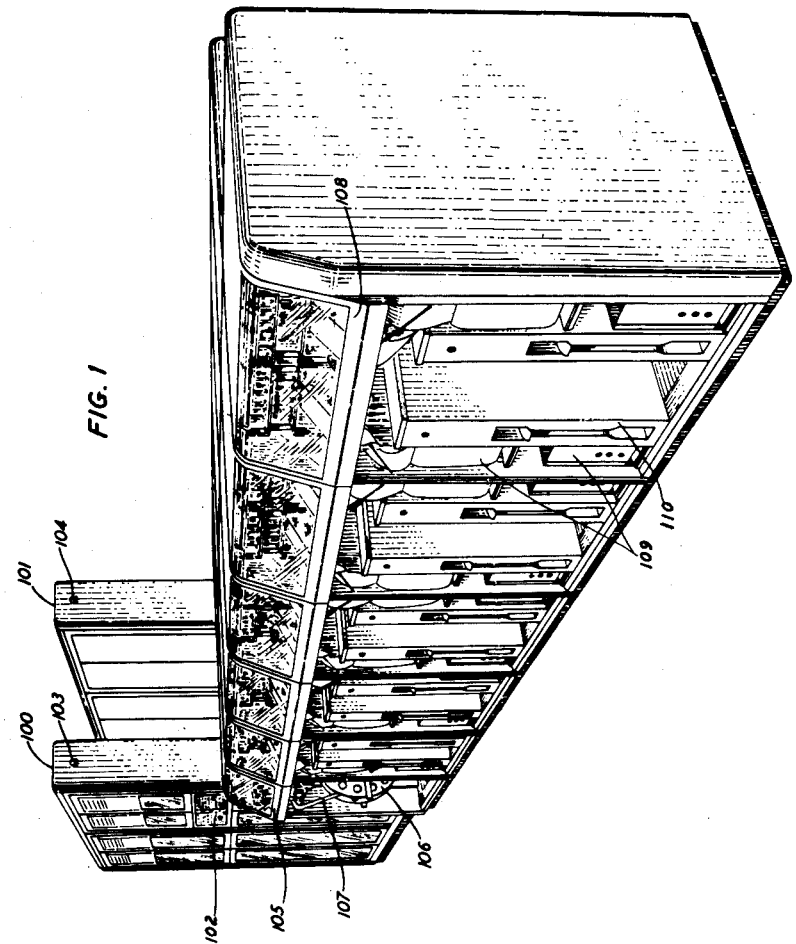
Fig. 1 is a perspective view of the racks and cabinets in which the device of the present invention is housed and is intended to give a general view of the device.

The exemplified embodiment of the present invention, as disclosed herein, comprises apparatus mounted in practice in or upon a cabinet or cabinets, a control panel, and a relay rack of the general nature illustrated in Fig. 1. Many mechanical details of the mounting arrangement are not disclosed herein either because they are well known in the art, would readily be devised by those skilled in the art, or described and disclosed elsewhere, or for a combination of these reasons.

The operative apparatus includes relays, a tape reader, tape perforators, otherwise designatable as recorders, and auxiliary equipment for supplying tape and storing the used or reproduced tapes.

The tape reader is disclosed in the application of W. W. Carpenter, Serial No. 666,280, filed May 1, 1946; obviously other devices of similar function may be employed.

The tape perforators may consist of devices such as disclosed in the application of W. W. Carpenter, Serial No. 588,401, filed April 14, 1945, now Patent No. 2,583,086, issued January 22, 1952.

The disclosure of the present application is related to the disclosures of a group of patents and applications generally relating to equipment which may constitute an accounting office. The object of an accounting office from the over-all viewpoint is to process a tape of the kind produced in a central office having recorded thereon data relative to telephone calls specifically originating in or, more generally, set up through or by means of said central office and to process said tape with the ultimate result of producing through successive steps typed records giving the details of toll calls made by each subscriber during a given period of time, typed message unit records giving the number of units to be charged to each subscriber for a given period of time in cases where such subscribers are billed on a total message unit basis, and typed records of so-called straddle calls, i. e., those in which, for one reason or another, the answer, the disconnect, or the initial entry relating to a call are present on more than one tape. Within the scope of the invention certain other information may be derived and produced as a typed record, for example, line observing information, verification of numbers of newly connected subscribers, etc.

A tape suitable for initial use in an accounting office of the class referred to may be one produced in accordance with the disclosure of the application of Cahill-Carpenter-Dimond, Serial No. 57,388, filed October 29, 1948, now Patent No. 2,599,358, issued June 3, 1952, or the equivalent thereof.

Such a tape may contain entries resulting from the use of many transmission circuits (which may be known as district junctors or by other designations) of the central office. In such tapes the initial entries contain, among other information, the calling subscriber line number, answer entries, disconnect entries, and day and hour entries. Because a single recorder may be used in common to and ordinarily is used in common to a number of transmission circuits, the initial, the answer, and disconnect entries of a particular call are interspersed with entries relating to other calls. Initial entries of calls never answered may also be recorded. However, each such entry is identified by the transmission circuit used for the purpose of this call and the number of this circuit forms a part of the entry record.

These trunk or transmission circuit number entries serve an essential purpose in the first processing of the single office tape which is sometimes referred to as assembling. The nature of the assembling process and a disclosure of equipment for accomplishing it is found in the Carpenter-Gooderham Patent 2,558,476, dated June 26, 1951, which resulted from application Serial No. 724,992, filed January 29, 1947.

The assembling process results in a series of tapes which, when spliced together in proper order, comprises the input tape for the apparatus disclosed in this present application.

The present invention disclosed and claimed herein consists of certain features of an accounting office now embodied in equipment known as a computer and which is sometimes more specifically designated as a computer-sorter because it may accomplish certain sorting functions.

A more elaborate disclosure of the computer is found in the application of A. E. Joel, Jr., Serial No. 101,087, filed concurrently herewith.

General appearance

The general appearance of one embodiment of the invention is given in the prospective view in Fig. 1. There are two cabinets 100 and 101 in which the relays and other small apparatus are mounted. The key and lamp panels are indicated at 102 and contain the set-up switches, the various lamps and the keys used in investigating the condition of the computer at any time, particularly after an alarm has been brought in. Two main alarm lamps 103 and 104 are indicated as being mounted near the top of the relay cabinets and are in such a position that they can be seen from any part of the large room in which this piece of apparatus is mounted along with similar appearing apparatus for the assembler, the sorter, the summarizer and the printer. Shown in this view, there are six cabinets of which the first one 105 houses the reader. A reel 106 below the reader holds a long length of tape such as 107 which feeds into the reader above and after being processed is returned to and wound on another reel. Each of the other cabinets such as the right-hand end one 108 houses a pair of perforators. In each of these cabinets there is mounted a bin such as 109 containing a long length of unperforated tape which after being processed by the perforator is fed into another bin 110. The computer may contain as many as nineteen perforators as will be explained hereinafter and each customer charge as it is computed is sorted by being selectively perforated on one or another of the various output tapes.

General operation

Fig. 2 is what might be termed a thumb-nail sketch to explain the organization of the device forming the subject-matter of the present invention. It consists of a reader 200 for reading the perforations on an incoming tape representing items of information comprising the gathered and assembled data for customer or subscriber charges. As the various codes are sensed by the reader they are then distributed by means of the register connectors 201 to registers 202. The registers here represent a temporary holding means for the information, part of which is used for calculating purposes or for internal rearrangement and is reregistered and part of which is retained in its original form before being routed to output tapes. At any rate a selecting means, here shown as the line pattern connector 203, is employed to glean from the registers selected bits and items of information and then through another distributing arrangement, the perforator connector 204 to route the computed charge data to the various perforators 205 whereby a plurality of output tapes are formed.

There are two communication channels, or trunks, one to transmit the incoming data from the reader to the registers and the other to transmit the outgoing data from the registers to the tape perforators. The registers form the heart of the device, for it is within this arrangement that the information is processed and held ready for the output circuit to make its selection and its records.

This Fig. 2 will then be regarded as a backbone or skeleton for the more elaborate schematic shown in Figs. 4 to 13, here arranged as shown in Fig. 3.

In this general schematic of the system, the input or reading means is shown in Fig. 4. This consists of a reader 400, a device essentially for the sensing of the twenty-eight code perforations in the automatic accounting system tape, incoming to this unit of the system and which has been produced as an output tape by the assembler. The reader consists of an assemblage of twenty-eight pins which seek to pierce the holes perforated in corresponding positions of the tape, those which succeed, signaling the achievement by connecting ground to a corresponding conductor and those whose path is blocked by unperforated tape holding their corresponding conductors open.

The twenty-eight conductors connected to the twenty-eight reader pins pass through the contacts of the reader connector 401 by means of which they may be connected as determined by the control circuits to the reading relays. In the case of the first three of these conductors representing the code for the first or A digit, an additional break is placed in the path of these conductors consisting of the make contacts of the ST3 start relay 402 in the off-normal and start circuit 403 so that the A digit codes cannot operate the A digit reading relays until the device has been properly started and is in satisfactory operation.

The coded grounds are thus extended to and operate the reading relays during the reading interval and so far as the registers into which the codes are read merely act to relay the ground signals from the reader. However, the reader closes but a single path whereas each reading relay controls a plurality of contact sets whereby the validity of a code may be tested and various other control circuits may be closed whereby the item of information contained in a code being read by the reader not only may be forwarded to a register but a part of the code may be used for control and other operations.

As clearly indicated in Fig. 4, the twenty-eight places of the code are allotted three for the first or A digit and five for each of the following five B, C, D, E and F digits. The A digit reading relays 404 consists of the A0, A1 and A2 relays and are used to index the line read and to thus classify the information contained in the other five digits.

By way of example, a zero in the A digit, signaled by the operation of the A0 relay, may be a splice code or a supplementary line of an initial entry, a 1 in the A digit, is a timing entry such as the disconnect or the answer time, the 2 in the A digit may be the first line of an initial entry, one of the tape identity codes or some special code and lastly a 3, signaled by the simultaneous operation of all three A0, A1 and A2 relays may be a special code such as a timed release at the disconnect time.

Each of the remaining five digit groups of reading relays such as the B digit group 405 has five relays designated 0, 1, 2, 4 and 7 and is known as a two-out-of-five group, since the code to express any one of the ten digits consists of the energization of two out of the five available relays in such a combination that the sum of their designations equals the digit expressed. An exception to this general rule is that the operation of the 4 and the 7 relays expresses the digit 0.

The splice code 081010 is then expressed by the operation of the A0 relay in the A digit group 404, the B1 and B7 relays in the B digit group 405, the C0 and C1 relays in the C digit group 406, the D4 and D7 relays in the D digit group 407, the E0 and E1 relays in the E digit group 408 and the F4 and F7 relays in the F digit group 409. Other codes are expressed in like manner.

The tape identity codes are those which have the same first three digits 289 and count from 2891XX to 2899XX so that in this case the 289 is used for certain control purposes, the 1 to 9 in the D digit for counting purposes and generally only the last two, the E and F digits for actual information purposes.

When it comes to the actual information codes, such as the timing entries and the initial entries, then only the A digit is used for indexing purposes and the rest are all used for true information purposes.

Other entries interspersed with the three informational codes above, such as the hour entries contain actual information in only the last two or three digits and identification of the entry in the others or at least in the first four or three thereof.

The computer is prepared for operation by adjusting a plurality of set-up switches to express information concerning a tape to be processed. Such switches are here represented by the E and F set-up switches 1100 and 1101, respectively, and by means of such switches the following information may be established.

1. Sort of MU calls to be effected
2. Marker group—tens
3. Marker group—units
4. First recorder—tens
5. First recorder—units
6. Last recorder—tens
7. Last recorder—units
8. Day of round—first
9. Day of round—last
10. Month—tens
11. Month—units
12. Round All of this information with the exception of the first will be found in the tape identity codes and these codes must check by automatic circuit operation against the setting of the switches before operation of the device may proceed.

After the set-up switches are adjusted and the incoming tape has been introduced in the reader the tape end key is operated temporarily and then the start key is operated. It is necessary to operate the tape end key first because the ends of all output tapes must be prepared before the computer can go into operation and, therefore, the circuit is so arranged that until the tape end key has been operated and then restored the operation of the start key will be ineffective. Once the tape end key has been operated the operation becomes automatic and twenty-seven or some multiple thereof of the splice code will be perforated in all the output tapes. In accordance with certain arrangements which will be fully explained hereinafter, nine codes are spread over the output tapes and this is repeated three times. If the tape end key is restored before this operation is complete, then the operation will halt after each output tape has had twenty-seven splice codes perforated therein, otherwise the operation will be automatically repeated. Thereafter, the start key will be effective.

In the lower part of Fig. 11 the rectangle 1102 represents the entry spread progress circuit and consists of a sequence arrangement known as a walking circuit, whereby the ten MU perforators are operated in turn followed in order by the perforators for the straddle tape, the line observing tape, the MU detail tape, and the six detail tapes or any selection of these which may be determined by the nature of the incoming tape and recorded on the set-up switches. These various perforators, or rather means to sequentially render them operative to perforate a given code are here represented by the relays such as the MU0 relay 1103 at the left to the DET6 relay 1104 at the left.

The control of this entry spread progress circuit over the perforators is here shown schematically by the conductors such as the 0 conductor 1105 controlled by the MU0 relay 1103 and the 6 conductor 1106 controlled by the DET6 relay 1104 which may be effectively traced over the path 1107 through the day sort control 1300 and the perforator register 1301 to the perforator connector relays such as the P-0 relay 1302 and the P-18 relay 1303. Thus, the perforators such as the PERF.0 designated 1304 and the PERF.18 designated 1305 may be sequentially connected to the trunk for controlling the perforations to be made.

This trunk consisting of twenty-eight conductors extends from the line pattern connector 1108, through Fig. 12 and Fig. 13 to the twenty-eight relays A0 to F7 here shown as the perforator check circuit 1306.

The 081010 splice pattern code is formed in the line pattern connector 1108 employed for the end of tape preparation. In this rectangle, there is indicated the 081 relay 1109 which will extend grounds to the conductors of the perforator code trunk described so that each perforator as it is sequentially connected to this trunk will, as before stated, perforate a series of nine splice pattern codes, to be repeated three times.

It may now be assumed that the tape end key is restored and the start key is operated so that the device will go into operation. The splice code on the end of the incoming tape will be passed through the reader until the tape identity codes are encountered. These are nine codes 2891XX to 2899XX in order. The first of these must have the tape index 02, indicating that the incoming tape is one prepared in a second sort operation by the assembler. In the computer then the first code encountered after the splice pattern is 289102 and no other code will advance the operation of this device to further operations. It may also be noted at this point that no other accounting system device will accept this tape except the printer when set for verbatim printing.

The tape identity codes are then read by the reader, each in turn, and the information they carry is checked against the information expressed by the setting of the switches such as 1100 and 1101, also here generally indicated by the rectangle 500. Each of the codes 2891 to 2899, inclusive, will be expressed by the A, B, C and D digit reading relays and passed to the tape identity progress circuit 501 wherein a series of relays such as L1 relay 502 and L9 relay 503 will respond as each line is checked. As each line proves satisfactory a signal is given over the RS1 lead 504 to operate the RS1 reader step relay 700 to properly advance the tape in the reader to the next code. On the last line the reader step relay is not operated immediately but held until this information can be spread on the output tapes. When the full nine lines of the tape identity codes have been checked, then the IC tape identification check relay is operated, and this will start the next operation by which the tape identification is spread on the prepared ends of each output tape, the complete nine lines on one tape and corresponding lines then repeated on the next tape under control of the entry spread progress circuit 1102. The TIE tape identification ended relay 505 operates after all the tape identification codes have been perforated in all tapes.

The specific information for each line of tape identification is derived from the setting of the set-up switches such as 1100 and 1101 under control of the line pattern connector 1108 for the end of tape, such information being transmitted over the output trunk to the perforators such as 1304 and 1305.

The output tape ends having been prepared and a reader step relay having been operated, the first code of the time group having an item of general information is read. This is the recorder number in the form 280XTU where the D digit (X) is used to indicate that the recorder is a regular or an emergency unit and the E and F digits provide the tens and units digits of any recorder number from 00 to 19.

The A digit reading relays are shown here as exercising a control over the control circuits 506 and these in turn over the paths 507 and 600 as controlling the recorder register connector 701. If no recorder number has been registered then the RCRA relay 702 will be operated to register the D, E and F digits being read by the reader in appropriate parts of the recorder register 703. It may be noted at this time that where the recorder number code is encountered again at the beginning of another section of the incoming tape, the RCCA comparing relay 704 will be operated so that the recorder number may be compared with the number previously registered.

The next code is the hour code, 2811TU, and now the control circuits 506, over the path 601 cause the operation of the hour register connector 602 to register in the earlier hour register 900 this hour entry (generally 03). If this is as now assumed the first hour entry, then the H1A-B relay 604 is operated to register the hour as read. It may be noted that each subsequent hour entry, 2810TU, is through the H0A-B relay 603 whereby the value of the hour is reduced by 1 as it is transmitted to the earlier hour register 900.

The hour having been registered in the earlier hour register it is now transferred through the hour transfer check connector 901 to the current or disconnect hour register 902. This being the first hour entry such transfer takes place immediately. Where, under other circumstances, there is an existing registration in the disconnect hour register 902, then a check is made to see that the hour registered in the earlier hour register is one less in value than such existing registration and when this is proved the said existing registration is released and that in the earlier hour register 900 is transferred to the disconnect hour register 902.

The third and final item of general information is the calendar day code, in the form 2821TU, where T and U stand for the tens and units digits of the actual calendar day. Again the control circuits 506 over the path 601 operate the day register connector 605, and the registration is made in the day register 903. This is made in the decimal code, there being four tens relays representing the 0, 1, 2 and 3 for the tens digits of the calendar day and a full complement of ten units digits. When this registration is complete the computer is ready to proceed to its main duties.

It may be noted that the central office tape having been passed through the assembler twice, once on a units digit sort and once on a tens digit sort there may be as many as one hundred sections in the 289102 tape coming to the computer. These time group entries will follow the splice code in every case and, therefore, the processing of each section of a tape is preceded by the reading of these three, recorder, hour and day entries. During the processing of a tape section, there may be regular hour entries and these will adjust not only the hour registration but the day registration, for as the hour changes from 00 to 23, at midnight, the date also changes. This usually results in the diminution of the date by 1 but may entail a complete change, such as from 1 to 31, 30, 29 or 28.

The recorder hour and day entries are not copied on any one of the output tapes but the registrations are held available to the line pattern connector whereby bits of information are gleaned from different sources to form the required output lines.

The computer acts as a sorting device to sort the various charges into different categories, such as message unit charges, toll charges, detailed records, line observing records and irregular records as well as discards. In addition, in single office marker groups, the message unit calls may be further sorted by one digit of their directory numbers. Tapes from multioffice marker groups must be sorted by offices. Where the incoming tape from the assembler contains records for more than one day the detail records may be sorted in days. The controls for these different sorting operations are primarily responsive to the information in the initial entries and are further vested in the set-up switches and certain auxiliary circuits as will more fully appear hereinafter.

A regular message unit (MU) call record consists of three entries, the disconnect time, the answer time and the initial entry and it is not known that this is a message unit record until the initial entry is reached. However, the disconnect time and the answer time are registered and transmitted to the calculator and generally the elapsed time is calculated before the initial entry is registered. All three entries, however, must bear the same call identity index. This is registered upon the registration of the disconnect time and the index with each of the next two entries is compared with it.

Let us take as an example a call made by a subscriber at station SUmmit 6-5444, within the period covered by a record about to be processed. The initial entry for such a call, which happened to be made over a facility identified by the call identity index 27 would be 213027
035444 in which the message billing index (digit C of the first line) is assumed to be 3 and the office index (digit B of the second or first supplementary line) is 3 and which combined with the marker group would identify the office SUmmit 6.

Let is be assumed that the call was answered at 11.535 and the disconnect took place at 11.582. The answer timing entry would then be

153527 and the disconnect timing entry would be

158227

Now this call would have been assembled by the assembler and recorded in such manner that it would now be read by the computer in the form:

158227
153527
213027
035444

Therefore, the reader may now be assumed to read the first of these lines:

158227

The control circuits 506, over the path 600, cause the operation of the DTRA-B relay 705 in the timing entry register connector 706 so that the B, C and D digits thereof may be transmitted through the B, C and D sections of the disconnect time translator designated 1000, 1001 and 1002, respectively, whereupon the three digits 5, 8 and 2 are translated from the two-out-of-five code to the biquinary code, which is peculiarly well adapted for calculation. After translation these three digits are transmitted to the adder 1003 where they are registered in the TD (tens, disconnect), UD (units, disconnect) and PD (tenths, disconnect) adder relays.

At the same time the disconnect time is transmitted to the disconnect time register where a record of this data may be retained until it is certain that it is no longer needed. The arrangement of the disconnect time register 606 and the disconnect time translators 1000, 1001 and 1002 is such that while both are operated by the reader, the latter are then held operated by the register 606. In this sense, the register is needed until the call has been disposed of. However, the register 606 has a regular output which may not always be used. In a regular MU call it is not needed but in a detail call or an irregular call it will be needed. It is, therefore, registered in the disconnect time register until the processing of the data for this call is completed.

The E and F digits 2 and 7, respectively, of this first line of the entry constitute the call identity index and must be registered to identify later entries of this same call. Accordingly, when this line is read by the reader the control circuits 506, over the path 607, cause the operation of the DJR2 relay 603 whereby the E and F readings of the code are transmitted over path 609 to the call identity index register and decimal translator 800. The call identity index is, therefore, retained for reference purposes and for comparison with the call identity index readings of the succeeding entries of this call.

When the disconnect time register 606 up-check circuit and the call identity index register 800 up-check circuits are closed showing a proper registration of this entry, the RS1 reader step relay 700 (circuits not indicated) is operated and the reader is advanced to read the next entry, the answer time.

The answer time line

153527 is now read by the reader. The control circuits 506, over path 600 now cause the operation of the ATRA-B relay 707 whereby the B, C and D digits 535 of this line are transmitted to the B, C and D answer time translators 1004, 1005 and 1006, respectively, for transmission on a biquinary basis to the TA, UA and PA relays of the adder 1003.

As soon as the adder up-check circuits report a satisfactory registration the elapsed time will be calculated. The method of calculating is to express the addend in its natural form, the augend as its nine's complement, to add in a one in the lowest denominational order and to ignore, or throw away the carry-one out of the highest denominational order. Thus, where the disconnect time is 58.2 and the answer time is 53.5 the elapsed time is 4.7 and this is arrived at by adding 582
464
1
───
1047 wherein the left-hand 1 is discarded so that the result becomes 047.

There are, however, other considerations in calculating the elapsed time and hence the value calculated in the tens order is carried through the hour tens adder 1008 so that 6 (for 60 minutes) or some multiple thereof may be added if there have been one or more hour entries between the disconnect entry and the answer time entry. In the present case we assume there have been no such entries and hence the value 0 is transmitted through the hour tens adder 1008 without change, and the three digits 047 are brought into the elapsed time round-off translator 1307, each to its corresponding denominational order. In actual practice, a small time allowance to cover traffic delay in establishing a connection after the called party has answered and delay in recording the disconnect signal is made and then the call is rounded off to the next higher minute. The details of these operations carried out in the elapsed time round-off translator 1307 are described in detail hereinafter. The output of these translators is chargeable time and as such will be used as described hereinafter. The carry-out from the tens translator goes into the control circuits (not shown) for purposes to be described. The carry-out 0 will indicate a negative result while the carry-out 1 will indicate a normal positive result and will constitute a signal to advance the operations.

As in the case of the disconnect time, the answer time also is registered in the answer time register 708. When the answer time up-check circuit is closed the AUC relay 709 is operated providing the call identity index also checks and the RS1 reader step relay is also operated to advance the reader to the first line of the initial entry.

Upon the operation of the ATRA-B answer time register connector relay 707 a ground is extended directly to the JCT-JCU call index check connector relay 610 whereby the E and F digits of the answer time line (constituting the call identity index) are extended for comparison with the call identity index already registered in the call identity index register and decimal translator 800. If the comparison of these numbers proves them to be identical then a check circuit combined with the up-check circuit for the answer time register 708 will cause the operation of the reader step control to advance the tape in the reader so that the first line of the initial entry may be read.

The first line of the initial entry is now read by the reader. The A digit is 2 and since this has been assumed to be an MU record the B digit is 1. The B digit in the first line of each initial entry indicates the general character, message unit, detail or line observing and will cause the operation of a corresponding relay in the input class register 509 which is of prime importance in the later operation of the output class register 1111. In this case the control circuits 506 over the path 607 operate the CLRA-B relay 611. The value in the C digit is transmitted to the billing index register 801 and the call index check connector 612 is operated as before to check the call identity index in the register 800.

The reader line count circuit 508 may actually be considered part of the control circuits 506 and is shown as being operated from the same source and as having a control over these control circuits. It functions to keep a count of the lines of code read for each group of lines constituting the charge data for each call. It is a steering means and is shown as providing a path for the connector relays for the supplementary lines of the initial entry.

Thus, on the first supplementary line of the initial entry which follows the proper entry of the first line and the successful comparison of the call identity index, the reader line count circuit 508 will cause the operation of the NRA-B-C calling number connector relay 613. Thereupon, the B, C, D, E and F digits of this supplementary line will be transferred to and registered in the calling number register and decimal translator 802, so that the output line or lines are now ready to be perforated if everything has been regular.

The B, C and F digits have output paths leading through the sort class connector 1110 to control the sorting of the call in accordance with predetermined conditions, particularly as recorded on the set-up switches.

Meanwhile, during the reading of the lines of the initial entry the computation of the elapsed time has taken place, so that during the registration of the last supplementary line the output is prepared. Assuming everything to be regular and the chargeable time to indicate nine or less message units, then the charge data becomes a single line transmitted to the particular output perforator selected by the sort class connector 1110 and the value of the digit registered in the calling number register 802. Under control of the output class register the DN directory number pattern forming relay 1200 will be operated to control the pattern of the output.

The number of message units is calculated from the computed chargeable time. The output of the elapsed time round-off translator 1307 is transmitted through the message units formula circuit 1201, under control of its connector 1202 and the calculated message units are registered in the message units register 1203. It may be noted that the chargeable time is in some cases also transmitted through the chargeable time translator 1204 and registered in the chargeable time register 1205 where it is available where details are wanted. In the case under assumption it is not needed and will not be used. However, the number of message units calculated and which have been assumed to be capable of being expressed in one digit are available over the F path coming out of the message units register 1203 and are transmitted by the BK1-A relay 1112 in the output class register 1111 to the B group of contacts of the DN relay 1200 so that the B digit of the output line will contain the computed charge in message units.

The calling line number is transmitted from the C, D, E and F parts of the calling number register 802 to the C, D, E and F contacts of the DN relay 1200 so that these digits of the output line will contain this calling line number.

The A digit of the output line is formed through the operation of one of the relays in the output class register 1111, such as the BK1-B relay 1113 so that this is recorded as 1.

Had the number of message units calculated been ten or over and, therefore, been capable of expression only in two decimal digits, then the output becomes a two-line entry with the DN pattern relay 1200 operated for the first and the TMU relay 1206 operated for the second line. In this case, the A digit of the first of these lines is recorded as 2 under control of the BK2-B relay 1114, and the B digit is recorded as 0 under control of the same relay (path not shown). The C, D, E and F digits are derived as before from the calling number register 802.

The second line is formed by the TMU relay 1206. The A and B digits both become 0 under control of one of the relays in the output class register such as the BK2-B relay 1114. The computer connector and control circuit 805 may be set to operate through the call type translator 907 to change the record in the B digit through the TMU relay 1206 from a 0 to a 1 or 2.

The C and D digits are invariably zeros in this line under control of the DAB relay 1115.

The E and F digits are supplied by the output of the message units register 1203.

As each output line is perforated the perforator check circuit 1306 reports the progress of the operations to the perforator control circuits 1309 and after a complete set of charge data lines have been perforated on a selected output tape the individual and specific operating units are released and made ready for another call. Items of general information, such as the hour and the day are retained since this information is common to all the calls within a given section of tape. In actual service there is an overlap operation of elements of the device, consisting of the release of the disconnect and answer registers as soon as it is determined that sufficient information has been stored for the perforation of an output tape. Thus, the disconnect and answer registers may be cleared before the computer has completed its task and the disconnect time and the answer time for the next call may be in process of being registered and may even be completely registered before the remainder of the device is released.

It is not necessary to describe in detail the complete operation in other types of calls. All calls or groups of items of information representing the data for each customer charge consists of three items, a disconnect time, an answer time and an initial entry. In each case the two timing entries are entered first so that they may be placed in the adder at the earliest possible moment so that the computation of the elapsed time may be made as the remaining information is being entered. The simplest case has been described in which certain of the apparatus provided has not been used. In the more complex cases such as the toll or detail call the area and called office register 803 and the called number register 804 are called into use to store information contained in the initial entry and from which information is gleaned by the pattern relays of Figs. 12 and 13 for forming the output lines.

One of the important items on all calls in which the details of the charge are reported is the start time line. This is a line coded from six digits of the day, hour and minutes at which the call is started, generally speaking, the answer time. The tens and units digits of the calendar day are taken from the day register 903, passed through the connector 904 to the day register translator 905 from which the tens digit is passed to the start time line register 906 for combination with the minutes tens digit from the answer time tens translator 1004 to form the B digit of the start time line. In a similar manner, the hour tens digit is taken from the disconnect hour register 902, passed through the start time line register connector 908 and combined in the start time line register with the minutes tens digit from translator 1004 to form the C digit of the start time line. The B and C digits thus formed are transmitted to contacts of the TM pattern relay 1308 for use as required. The D digit of the start time line is the units day digit and, therefore, is the F digit coming out of the day register translator 905. The E digit of the start time line is the units hour digit and, therefore, is the units digit taken from the current or disconnect hour register 902, passed through the start time line register connector 908 and registered in the time pattern register 909. The F digit of the start time line is the units digit of the minutes and comes from the units section of the answer time register 708 and is passed through the start time line register connector 908 and registered in the time pattern register 909.

Thus, the main elements of the computer and their cooperative relationship to each other have been briefly noted and may be summarized as follows. The computer consists of a reader for reading off items of information from an incoming tape, a plurality of registers and translators for storing the information, a calculator for computing charges, a pattern circuit for supervising the lines of a computed charge and a plurality of perforators, selectively taken into service for recording the computed charges under control of the reader.

Supplementary to these regularly employed elements is the straddle circuit which has supervisory functions and acts to keep a constant watch on the operations of the computer so that if there is any deviation from regularity the control is seized and the call is then disposed of under direct control of this circuit. Certain calls such as don't answer and busy calls are discarded and others are recorded on a straddle tape where full details may be spread before a clerk for proper disposition. The important element in this circuit is the entry progress register which has a connection from each of the registers to report the proper operation thereof. Herein is shown, by way of example, the path 614 leading from the disconnect time register 606 to the entry progress register 510 to report the proper entry of the disconnect time. Should the disconnect time fail of registration and the other elements of the call be properly registered then the entry progress register would report a call with only one timing entry and if this were at a leading tape end the straddle input register 511 would be operated, in turn operating the straddle output register so that details of the call would be reported on the straddle tape. There are numerous circumstances by which the straddle circuit takes charge of the output circuit, dealing with numerous causes of irregular calls, all of which are more fully described in the said Joel application.

*Feature 1*

Feature 1 is a translator which will combine six digits gleaned from various sources into a five-digit code. Specifically, this translator will combine three digits into a two-digit code and add into three other digits to form a complete five-digit code. In the specific embodiment of this invention the translator is employed to formulate what is known as the start time line and this identifies the day, the hour and the minutes at which the use of a given facility was started. Each of these three items, the day, the hour and the minutes may be expressed by two digits, a tens and units digit for each. The day and the hour are contained in information which is included in the items of common information whereas the minutes is information included within the specific items of information for each use of a facility specifically for each telephone call made.

In Fig. 15 the reader is indicated by the rectangle 1500. This is a device hereinabove explained which reads off the codes contained in an incoming tape. A device known as the reader connector 1501 is employed to connect the contacts of the reader through to the reading relays indicated in the rectangle 1502. In the operation of the device the information including the date on which any particular tape was made is transmitted during the tape identity information leading through the day register connector 1503 to the day register and translator 1504 where it is stored and held available for any use necessary later on during the further functioning of the computer.

In a similar manner the information regarding the hour is also read off the incoming tape by the reader and transmitted through the hour register connector 1505 to the hour register 1506 where it also is stored and held for use through the functioning of the computer. It may be noted that the registration in both the day register 1504 and the hour register 1506 is subject to change through the succeeding hour codes encountered on the incoming tape.

Among the specific items of information included in the data for each telephone call will be the answer time, that is, the time at which the established telephone connection is answered by the called party. The tens and units digits of this answer time will be transmitted from the reader through the reader connector and the reading relays through the entry register connector 1507 to the minutes tens relays of the start time line translator 1600 and the minutes units register 1508. When these digits are transmitted then circuits will be set up as follows. It will be assumed in this case that the day is 15, the hour 12 and the minutes 35. Therefore, the minutes 3 relay 1601 will be operated and the day tens digit 1 will be transmitted from the day register 1504 to operate the day tens 1 relay 1602. The minutes tens 3 relay 1601 will ground two conductors which will be extended by the DT1 relay 1602 to the No. 2 and No. 4 code leads 1603 and 1604 specifically leading through the B digit contacts of the TMA–B–C relay 1605 in the line pattern connector to the B digit of the circuit of the perforator 1606 so that the digit 6 is perforated in this digital place.

At the same time the hour tens digit 1 is transmitted through the hour tens place 1510 in the start time line register connector 1509 to ground the two conductors for the value 1 which will now be extended by the MT3 relay 1601 to the 0 and 1 code conductors 1607 and 1608, respectively, leading through the C digital place contacts of the TMA–B–C relay 1605 whereby the digit 1 is perforated in the C place 1609 of the output tape by the perforator 1610.

The D digital place in the perforator will be derived as indicated from the day units registration 1511 of the day register 1504. The E digit will be derived from the hour units registration 1512 of the hour register and transmitted through the start time line register connector 1509 and the answer hour units register 1513 to the E digital place of the perforator 1610. In a similar manner the minutes units will be derived from the minutes units register 1508 transmitted through the minutes units portion of the start time line register connector 1509 through the supplementary answer time register 1514 to the F digital place of the perforator 1610.

Thus, upon the reading of the answer time by the reader the tens and units digits thereof will be combined with the tens and units digits of the day and the hour previously registered to form by the start time line translator 1600 the five-digit code representing the information contained in these six digits.

*Feature 2*

This feature is an arrangement or a provision of means for discriminating between valid and invalid charges and consists essentially of discarding means which act to clear out the registers of the computer without making any output record and to thus clear the way for the computation of the next charge. One of the important elements in the computer is the so-called straddle circuit which keeps a constant check on the operations and does not interfere so long as the operations are regular and in accordance with prearranged patterns. There are alerting or preliminary signal means which will operate on the first indications of irregularity and which will put the straddle circuit into condition to immediately take charge of all ensuing operations and to then divert the output to the straddle tape or alternatively to the discard.

Let us take first, by way of example, a circumstance of fairly common occurrence. The original or central office tape is cut at 3:00 a. m., which is supposed to be the time at which traffic is at the lowest ebb. Let us suppose that just before this tape is cut a subscriber has initiated a call but that the tape is cut before the called party has answered. His call thus straddles two tapes, the initial entry being on the trailing end of the first tape and the answer time and disconnect time being on the leading end of the second tape. Now, when the first tape is processed at the accounting center, it will be read backward so that for all valid and complete calls the items will be read in the order: first, the disconnect time; second, the answer time; and third, the initial entry. Thus, the call under discussion will appear as a lone initial entry without other complications. This will result in the operation of the STLA straddle circuit relay 1700 and the straddle circuit will take charge and divert this information so that it may be properly reported so that a clerk may couple it later with the remaining items reported on the straddle tape of the second central office tape. If, however, this initial entry is preceded by an hour count of two or more, it is evident that this is a DA (don't answer) and that it should be discarded. In this case, the DSDA discard relay 1701 will be operated whereupon the computer circuits will be released and made ready to receive the data for the next call to be processed.

As the leading end of a tape is inserted in the computer circuit a series of splice pattern codes will be read and this is followed by what is known as the skip splice code which will cause a grounding of the 286 lead 1702. This is indicated by a circuit extending from ground through a check circuit indicated by a broken line and which checks the fact that the reading relays 1703 have been operated in a valid combination, thence through contacts controlled in the A, B and C digits to the 286 conductor 1702, thence through contacts of the SSD skip splice control relay 1704 to operate the SSA relay 1705.

Assuming that the straddle circuit is in normal unoperated condition the straddle down-check relay 1706 will be operated so that a ground is extended from an armature and contact thereof through an armature and contact of the SSA relay 1705, an armature and contact of the SPFB relay 1707, armatures and contacts of the ARB relay 1708 and DRB relay 1709, both of which are in the entry progress register circuit 1718 and are released at this time because neither the answer time nor the disconnect time has been registered, thence through a contact and armature of the SDC relay 1706 to operate the PE preliminary impulse relay 1711. The PE relay is known as a preliminary signal relay and through its operation conveys the information that the straddle circuit may be needed shortly. The PE relay in operating thus alerts the straddle circuit.

Through the operation of one of the start relays STB4, here designated 1712, a ground is extended through an armature and front contact of the SDC relay 1706, an armature and back contact of the PTEB relay 1713 to cause the operation of the SLKA-B relay 1714. This relay extends a ground through a front contact and armature of the now operated PE relay 1711, through armatures and back contacts of the ARC relay 1715 and the DRC relay 1716 to the armatures of the CLB relay 1717 so that a ground is awaiting the operation of this latter relay to be further extended.

Through the operation of the SLK relay a ground is also extended from an armature and front contact of the PE relay 1711, a front contact and armature of the SLK relay 1714 to the winding of the PTEB relay 1713. As soon as the reader advances from the skip splice code which grounds the conductor 1702 the SSA relay 1705 is released so that now a circuit is established from ground through a series of back contacts of the TMRL relay 1718, the TOS relay 1719, the RC relay 1720, the SSA relay 1705, an armature and front contact of the now operated PTEB relay 1713, a back contact of the armature of the DRC relay 1716, an armature and back contact of the HR2A relay 1721 to operate the SHC special hour count relay 1722. This relay places a ground on a circuit extending through a back contact and armature of the DTMB relay 1723 in the reader line count circuit to the armature of the HR2 relay 1724 which responds on an hour count of two and which before this count has been reached, therefore, extends the ground to the armatures of the S2 relay 1725 and the T2 relay 1726 ready to operate the STLA relay 1700 on an S or T signal. If, on the other hand, the HR2 two-hour count relay 1724 has been operated, then the ground is extended instead to cause the operation of the HR2A relay 1721, thus rendering the DSDA relay subject to operation instead of the STLA relay 1700.

If at this time a lone initial entry is encountered, then a circuit will be established from ground through the up-check path of the register in which the first line of the initial entry is registered to the CLB relay 1717 which thereupon operates and extends a ground to the S2 relay 1725 so that the STLA relay 1700 is operated. If, however, the lone initial entry has been preceded by two hour entries before it is read, then the HR2 relay 1724 will have been operated so that upon the closing of the up-check circuit for the first line of the initial entry the S2 relay will be ineffective. However, the CLRA relay, the connector for the first line of the initial entry, will close a circuit from ground through the down-check circuit of the entry progress register before this initial line may otherwise affect the entry progress register and this ground will thus be extended through an armature and front contact of the HR2A relay, through an armature and front contact of either the MUB relay 1727 or the DETB relay 1728 to cause the operation of the DSDA relay 1701. The MUB and DETB relays are in the input class register and are, of course, operated before the first line of the initial entry may be transferred through the operation of the CLRA relay 1729 to the entry progress register.

Thus, it will be seen that the straddle circuit may be alerted by a preliminary signal and thereafter will differentiate between a valid entry to be reported on the straddle tape or an invalid entry to be discarded.

It may be noted that isolated initial entries where there is no indication that they must be recorded on the straddle tape or recorded on a line observing tape are used to operate the DSDA relay 1701 so that this information may be discarded. Such isolated initial entries represent don't answer or busy calls in which the initial entry has not been followed by an answer time or a disconnect time entry. In such cases, the CLRA relay 1729 of the initial entry register connector extends a ground through the down-check entry progress register circuit and thence through an armature and back contact of the HR2A relay 1721 and a back contact and armature of the PTEB relay 1713 not operated under these circumstances over the circuit previously traced to operate the DSDA relay 1701.

Another example of the operation of the discarding means may be found in the operation of the INO index 0 relay 1730. When a test call for which no charge must be made is established, such a call is indicated by the index 0 in the C digit of the first line of an initial entry. Under regular operation the ARC relay 1715 responding to the proper entry of an answer time will be operated and this will extend a ground from the armature of the INO relay 1730 to the DSDA relay 1701 so that if this relay in response to the clear indication that the call is a test call is operated, then the DSDA relay 1701 will be operated and the call will be discarded without a charge being made to the calling subscriber. If the INO relay 1736 is operated while the PTEB relay 1713 is in normal position, then the DSDA relay will be operated directly and the call discarded also as a don't answer call where no timing entry has been registered.

*Feature 3*

A third feature of the present invention is the provision of a plurality of pattern relays each provided to glean bits of information from various sources to form a specific output line. Each different charge computed results in some specific type of output and hence the output class register controls the number and sequence of operation of the pattern relays and each of these gleans informations from various sources for the purpose stated. One example of the use of a pattern relay has been seen in the use of the TMA-B-C relay 1605 which gathers the information for the start time line from the start time line translator 1600, the day register 1504, the hour register 1506 and the minute units register 1508. The general operation of the pattern relays will now be described with the help of Figs. 19 to 28, inclusive.

As a specific example, let us assume that the subscriber at ME 6-2432 makes a call to some other local subscriber and that his call is answered at 2:59.4, that is, just shortly prior to 3:00 a. m. in the morning and that some time during the conversation and before the disconnect time has been registered the tape has been cut. This central office tape is then taken to the accounting center where it is processed first by the assembler which will thereupon group together the items of information all bearing the same call identity index (let us assume 26) and it will appear that this group consists of the answer time and the initial entry (in that order) on the leading end of the output tape from the assembler. This tape now goes to the computer and in accordance with the description of Feature 2 the preliminary signal relay 1711 will be operated so that circuits for the ST relay 1725 and the T2 relay 1726 are prepared.

When these two items of information are read from the tape after the preliminary signal means have been operated then the first timing entry entered will go into the disconnect time register and the DRC relay 1716 will be operated. Although this is actually the answer time the device has no way of knowing whether the first timing entry received is an answer or disconnect time and, therefore, as stated this answer time goes into the disconnect time register. When later the initial entry is recorded there will be a combination of the CLB relay 1717, the DRC relay 1716 operated, with the ARC relay 1715 remaining unoperated. With the PE preliminary signal relay 1711 operated and the SLK relay 1714 operated as hereinbefore described, one of the relays such as the S2 relay will now be operated. These relays are shown in Fig. 22 and in this case the SI2 relay 2200 will be operated to indicate that this is a splice followed by one timing entry and an initial entry.

The call is a message unit call since no called subscriber's number has been registered as would be the case in a toll or detailed call. Therefore, the MU relay 2201 in the input class register is operated. Also the STLA-B relay 2202 is operated through the operation of the SI2 relay 2200.

The perforator control now operates to complete the information regarding this one timing entry and initial entry properly registered in the registers of the computer to be formulated and perforated on the straddle output tape. Therefore, the STA start relay 2100 operates and extends a ground supplied by the SKT relay 2101 over a front contact and armature of the ST5 start relay 2102, an armature and front contact of the LK relay 2103, the LKA conductor leading through a down-check circuit of the PL relays of the perforator line count circuit to the PL11 conductor, thence through an armature and front contact of the STA relay 2100 to the PL1 conductor to cause the operation of the PL1 relay 2000. This relay operates and locks over a series of armatures and back contacts of the succeeding PL relays to the LKL1 conductor supplied with ground through the contacts of the ST5 start relay 2102. When the circuit is in proper condition the advance relay 2104 will extend a ground through an armature and contact of the E2A-B entry two relay 2105, an armature and front contact of the STLA-B relay 2202, an armature and front contact of the SI2 relay 2200, an armature and front contact of the MUA-B relay 2201 to cause the operation of the IMU relay 2300.

Upon the operation of the IMU relay 2300 a ground will then be supplied from the perforator control circuit in Fig. 21 to the OP conductor leading through an armature and front contact of the MST motor start relay 2001 now operated and thence through an armature and front contact of the PL1 relay to the L1 conductor 2002 which will be closed by the IMU relay 2300 to a conductor leading to the winding of the TM relay 271. Hence, the TM relay is the first of the pattern relays to be operated. This relay will invariably cause the entry index 23 to be transmitted to the A and B digital places of the output perforator. The C and D digits will be supplied from the recorder register here indicated by the rectangle 2701. Let us assume that the recorder No. 7 is the one involved so that the digits 0 and 7 will be supplied for the C and D places. The E and F digits will be the call identity index and will be derived from the day and junctor register here represented by the rectangle 2702. Let us assume that the call identity index is 26 in this instance. Therefore, the operation of the TN relay will synthesize the code 230726.

Upon the operation of the STLA relay and after the initial entry has been registered the NRA relay 1900 in the initial entry register connector 1901 will extend a ground through an armature and front contact of the MUA-B relay 2201, a front contact and armature of the STLA-B relay 2202, an armature and front contact of the STC2 relay 2203 to cause the operation of the SPFA relay 2204. This is known as the straddle perforate relay and starts the perforating operation. A ground is now extended from the perforator control circuit over an armature and front contact of the STLA-B relay 2202, an armature and front contact of the SPFA relay 2204 over the STDL conductor 2205 to operate the perforate connector relays 2800 and 2801. This particular No. 10 perforator will prepare the straddle tape. Therefore, through the operation of the P10 relays 2800 and 2801 and the TN relay 2700 the code 230726 is punched in the outgoing straddle tape by the No. 10 perforator 2802.

The successful operation of the perforator is reported to the perforator control circuit which thereupon responds by placing a ground on the PA1 conductor 2107 which ground may now be traced through a front contact and armature of the TN relay to conductor 2703 traceable through a chain of contacts on the PL relays of Fig. 20 to operate the PLA1 relay 2003. The perforator control circuit will next place a ground on the PL conductor 2108 which will be extended through a chain circuit controlled by the PLA relays to cause the operation of the PL2 relay 2004. Upon the operation of the PL2 relay 2004 the TN relay 2700 will be released and the LTA relay 2704 will be operated in its place. This relay controls the make-up of the second line of the entry. It will be noted that the A digit of this line will be in common with the A digits of all the remaining lines of this entry and will be zero. The B digit of this line will be derived over conductor 2705 from contacts on the S12 relay 2200. In point of fact and as clearly shown in the detailed drawings contained in the Joel application the IMU relay 2300 will supply grounds through contacts of the S12 relay 2200 to synthesize the digit 9 over the path 2705 so that the straddle index 9 indicates that other straddle entries of the same call are located on the same straddle tape as adjacent entries. Note the two straddle entries in horizontal lines 10 and 11 of Fig. 30. The C and D digits for this line are derived from the day register 2500 and translated over the path 2501 to the C and D sets of contacts of the LTA relay 2704. We will assume that this is the 31st and that the digits 3 and 1 are, therefore, placed in the C and D places. The E and F places are derived from the start time line register 2706 and the time pattern register 2707. We have assumed that the call was made after 2:00 a. m. and hence the answer hour is 02. Therefore, the LTA relay synthesizes the code 093102.

It is believed that the further operation of this pattern relay need not be described in such detail. The third line of the entry will be under the control of the PL3 relay 2005 which will cause the operation of the DN relay 2600 and the code 002432 will be derived as follows. The 0 in the B digit is the office index which in connection with the marker group number 00 represents the office ME6. The four-digit number 2432 is the calling line number and is derived from the calling line number register 2502.

The next line is synthesized through the use of the ITB relay 2601 under control of the PL4 relay 2006. The B, D and E digits are blank and are represented by zeros. The C digit is taken from the billing index register 2602 and may be assumed in this case to be 8. The F digit known as the straddle charge index is derived from the TR2 relay 2206 and in this case will be the digit 2. The TR2 relay is operated as a result of the registration of a charge guard code 285400 between the answer time and the initial entry on the tape coming from the assembler and brought into the computer. It may be noted that this charge guard code is one which is spread onto all the output tapes of the assembler under certain conditions and results in the order to cancel the charges. In point of fact this code may have nothing to do with this particular call but it has been further expedient to forego the revenue on all calls in the process of assembly when some trouble occurs that necessitates the transmission of this charge guard code to one of the perforators of the assembler so that instead of confining the transmission of this code to one, it is spread on all. This does not necessarily mean that the revenue of ten calls is given up and it may mean that no revenue is abandoned. In some cases, however, as in the present, this charge guard code will be perforated among the items of an assembled call and if it occurs as we assume it does here between the answer time and the initial entry, then the orders are to cancel all charges. The operation of the ITB relay 2601, therefore, synthesizes the line 008002 so that the complete entry now perforated in the straddle tape is as follows:

230726
093102
002432
008002

This entry will be found near the bottom of the third column in Fig. 29 and the top of the next column and the result of processing this entry through the printer will be found in horizontal line 11 of Fig. 30 which is translated as follows. On the regular recorder 07 and through the agency of a facility identified by the call identity index 26 a call, another portion of which may be found as an adjacent entry on the same straddle tape, was made on the 31st of the month some time after 2:00 a. m. by the telephone number ME 6-2432 under a message billing index of 8 but for which no charges must be made since the orders are to cancel all charges.

Thus, it will be seen that through the use of the perforator line count circuit of Fig. 20 which will successively operate various pattern relays selected by the relay such as the IMU relay 2300 of the output class register the output entry may be formulated ready for printing. In this particular case where the output has been diverted to the straddle tape that no further processing other than the printing of the straddle page is necessary but in other cases where the calls fall into regular patterns the output of the computer will have to be in accordance with the line numbers and then the results for a number of days comprising a billing period will have to be summarized before the printing of the lists and tickets is undertaken.

*Feature 4*

This feature is the use of the so-called straddle circuit as a monitoring or supervisory circuit which keeps constant vigil on the operations of the computer and exercises an immediate control when any deviation from regularity occurs. Several aspects of this straddle circuit have been pointed out hereinabove. It has been shown how certain conditions give rise to a preliminary signal which alerts or makes the straddle circuit ready and it has been shown in connection with Feature 3 how the straddle circuit actually takes over and causes details of a call to be perforated on the straddle tape.

It might be said that the entry progress register, indicated in Fig. 19, is the heart of the present device, for this circuit includes a plurality of relays each having the duty to report the proper and regular progress of the operations of the computer. The full details of the entry progress register are shown in Figs. 86, 87, 115 and 116 and are described in the above-mentioned Joel application. The present showing is schematic and scanty.

Providing the call has been regular in all respects, then the DA relay 1902 in this circuit will be operated. This relay is one which responds to report that the disconnect and answer times have been properly registered and that no other circumstance which will affect the call has been noted. In this case then when the CLRA relay 1903, which reports the entry of an initial entry, is operated a circuit is established from ground controlled by the CLRA relay 1903 through an armature and back contact of the DAK relay 1904, an armature and front contact of the DA relay 1902 to cause the operation of the RSRT relay 2207. This is a start relay in the output start circuit which controls a regular sort and, therefore, avoids the deviation of the call to the straddle tape.

If, on the other hand, the DAK relay 1904 had been operated which would report the disconnect and answer times properly registered followed by a cancellation signal and this particular cancellation signal had been a 285400 code which would have resulted in the operation of the A54B relay 1905, then upon the operation of the CLRA relay a circuit would have been established to the LOCC relay 2208 to report the details of a call in which the charges have been cancelled to the line observing tape as well as to the regular tape in which such calls would have been recorded.

Let us suppose that neither an answer time nor a disconnect time has been recorded and that a lone initial entry has been encountered. In this case a ground will be extended by the CLRA relay 1903 over a back contact of the D relay 1906, thence through an armature and back contact of the HR2A relay 2209, through a contact and armature of the MUAB relay 2201 to the DSDA relay 2210 resulting in the discarding of the call.

Let is suppose that only a disconnect time has been registered and that the relay 1906 has been operated. This may represent a call in which for some reason or other a disconnect time has been lost and since the first timing entry is always registered in the disconnect time register the one timing entry going with this initial entry has, therefore, been registered as a disconnect. This may be in the absence of other indications a good call and for which the calling subscriber must be charged. However, since it is not known how much overtime is used, then the overtime must be cancelled and the subscriber charged only for the initial period. Therefore, with the D relay 1906 operated when the CLRA relay 1903 operates a circuit will be extended to the COT cancel overtime relay 2211 for the proper disposition of the call.

There is a number of relays shown at the bottom of Fig. 22 within the rectangle 2212 which is designated the straddle input register. These relays are all operated in accordance with various combinations of the relays of the entry progress register shown in Fig. 99 and the details of these connections are fully set forth and explained in the said Joel application. The relays ATA and ATC respond to transfer signals following an answer time code which means that the regular recorder on which the first code was recorded has been taken out of service and that an emergency recorder has been placed in service in its stead. Under either of these conditions then these relays will cause the operation of the STLA–B relay 2202 which is the main relay in the straddle circuit to take over the operations thereof. In like manner the AE relay whose function is to respond to the end of tape splice following answer will cause the straddle circuit to be enabled. The DTA and DTC relays respond to transfer signals after a disconnect entry and the DE relay responds to an end of splice signal following a disconnect and, therefore, brings the straddle circuit into operation.

Just above these relays in Fig. 22 there is a series of relays T2, S2, etc., of which one, the S12 relay 2200, has been described hereinbefore in connection with Feature 3. These relays also respond to various combinations of operating relays in the entry progress register and in like manner cause the operation of the STLA–B relay 2202. It has been explained hereinbefore that the S12 relay responds to a condition set up by a splice pattern, a single time entry and then an initial entry. The functions of all these relays are set forth in the Joel application and their operation is explained in considerable detail there.

It, therefore, appears that we have the combination of a progress recording means in the entry progress register, a plurality of means in the input class register, means for evaluating a trouble indication and an output class register controlled by the above three for controlling the form and contents of the output.

*Feature 5*

This feature has been set forth hereinbefore as a check circuit whereby a duplicate check is made in order to operate the STCI start relay 2213. It has been set forth hereinbefore that not only must a piece of general information be checked but that a piece of specific information relating and included in this general class be also checked. This check circuit is included in the entry progress register in Fig. 19 and starts from a source of battery going through a very long check circuit here indicated by a broken line and parts of which are shown specifically as armatures and contacts of such relays as the D54C, D56C, DRK, DK, ARB and DKA and finally ending up in the winding of the STCI relay. Thus, in an example hereinbefore given when a cancellation signal which operates the D54C relay 1907 is operated then this condition is matched by the operation of the DRK relay 1908. The DRK relay indicates that a disconnect timing entry has been entered followed by a cancellation entry and the D54C relay indicates precisely the type of cancellation entry which has been entered. Therefore, the check circuit is closed through an armature and front contact of the D54C relay and also a front contact and armature of the DRK relay 1908. In a similar manner when the DRK relay is operated it is necessary that the DK relay indicating a disconnect timing entry be operated so that the check circuit is now also closed through an armature and front contact of the DRK relay 1908, a front contact and armature of the DK relay 1909, thence through an armature and back contact of the ARB relay 1910 which non-operated indicates that no answer time has been entered, a back contact and armature of the DKA relay 1911 which through non-operation indicates that no answer time followed by a cancellation entry has been entered and thence over similar circuits to the STC1 relay 2213. This check circuit contains a large number of these combinations but for the sake of clarity and brevity only the few noted have been shown.

*Example of straddle tape*

Figs. 29 and 30 illustrate a straddle tape produced by the computer.

Fig. 29 is a list of the codes on the straddle tape presented here in the form of a list of numbers rather than an illustration of the actual perforations in the straddle tape. Such a list of numbers may be produced by placing the actual perforated tape in the printer circuit and setting this for verbatim printing so that the result is an exact duplicate of the straddle tape merely translated from the perforations to the characters which the codes represent.

Fig. 30 is a straddle page produced by the printer using the same perforated straddle tape as an input so that this is a final result which will be placed in the hands of an operation to make up charges in accordance with the information presented.

In Fig. 29 the list of codes contains first the code 081010 which represents a long succession of these codes known as the splice code found in all accounting center tapes. Following this there are nine codes in the 2891 to 2899 series which present the tape identity information. In each of these codes the last two digits present a particular piece of information.

For instance, the first of these codes 289160 indicates in its last two digits the number 60 which is the tape index meaning that this type 60 tape is one which has been produced by the computer to record items of information controlled by the straddle circuit and which tape will thereafter be presented to the printer for producing the straddle pages such as that shown in Fig. 30. The next item 289200 indicates that the marker group is that numbered 00. The next item 289300 indicates that the first recorder number is numbered 00 and the following item 289419 indicates that the last recorder number is 19. The code 289500 indicates in its fifth digit that the office code is 0. In this particular instance, the 0 office in the 00 marker group will be cross-connected in the printer circuit in such a way as to produce the office ME 6 (Media 6).

The next code 289690 shows the thousands range to be between 9 and 0. The code 289756 shows that the first day of the round is 5 and the last day is 6. It may be explained that when the month is divided into six five-day rounds that this means that the fifth round may have either 3, 4, 5 or 6 days included therein. In the present case this straddle tape is for the month of October and, therefore, will contain six days, the 26th to the 31st, inclusive.

The next code 289805 shows in its fifth and six digits the tape section 0 and the round 5 and the last code 289910 shows the month 10 (October).

When this tape is to be placed in the printer the manual switches of the printer are set as follows:

| Switch | Setting |
|---|---|
| Previous sort | Unsort |
| Tape type | Straddle |
| Marker group—Tens | 0 |
| Marker group—Units | 0 |
| Central office | 0 |
| Thousands—First | 0 |
| Thousands—Last | 0 |
| Month—Tens | 1 |
| Month—Units | 0 |
| Round | 5 |

With the manual switches of the printer circuit set in the above manner then, this 60-type tape will be accepted by the printer and as soon as the reader has gone through this tape identity information in the 2891 to 2899 codes, the printer will produce the first line shown on the straddle page, Fig. 30. It may be noted that the printer is arranged to print a given number of lines to form a page and that when this number of lines has been completed the printer will automatically operate through its carriage return and line feed functions several times and thereafter reproduce the information shown in line 1 of Fig. 30 provided, of course, that the number of items in the straddle tape is more than enough to fill a single straddle page. In the illustration here given no attempt has been made to show more than one page and, therefore, this title is only shown in one instance.

The information contained in this first line

00 OCT 5 is information all taken from the above tape identity information and means that this straddle page relates to information gathered from marker group 00 during the month of October and during the fifth round of that month. When this has been printed the printer circuit will scan, translate and print the other lines shown in Fig. 30. By scanning this list of codes it will be noted that there are fourteen groups of codes each starting with a line beginning with a 2 in the A digit and containing two or more supplementary lines each beginning with a 0. Each such group of codes is known as an entry and the first of these 255300
053010
046404 is an entry produced by the straddle circuit of the computer and contains the following information. The 5 in the B digit of the first of these lines is an entry index denoting in this case that the entry is a timing entry and that it is a straddle entry. The next two digits 53 in the C and D places indicate that the entry was made on emergency recorder No. 03. If this had been a regular recorder then the code would have been 03 instead of 53, the 0 in the tens place having been changed to 5 to indicate that the entry has been made on an emergency recorder. The last two digits 00 are known as the call identity index.

In the second line of this entry the 5 in the B digit is a straddle index and indicates that other straddle entries of the same call are located on the same stradle tape (probably two non-adjacent entries). The 30 in the C and D digits of this line indicates the day and the 10 in the fifth and sixth places indicates the hour during which this entry was made.

In the third line the 464 in the B, C and D digits of the line indicates the minutes, that is, 46.4 minutes. The 0 in the fifth place is known as the time release index and is always 0 for normal calls. Lastly, the number 4 in the F digit of this last line is known as the straddle charge index and indicates that the call must be cancelled if this timing entry is an answer time and that the overtime must be cancelled if this timing entry is a disconnect time. With this information the line 2 in Fig. 30 will be printed. Its meaning is that emergency recorder No. 3 has recorded a timing entry having a call identity index 00 and which timing entry is one of three entries, the other two of which are to be found on the same straddle page, the entry having been made on the 30th of the month during the tenth hour at 46.4 minutes after the beginning of this hour and that the charges are to be treated as above denoted, that is, all charges are to be cancelled if this is an answer time but only the overtime charges are to be cancelled if this is a disconnect time.

In the list of codes shown in Fig. 29 there are, as above stated, fourteen of these groups of codes, each one of which carries the information for causing the printer to print each of the fourteen lines shown in Fig. 30. No detailed explanation will be given of the exact meaning of each of these codes but the interpretation of the code and the disposition of the information when the straddle page is placed in the hands of an operator will be explained instead.

For purposes of explanation the horizontal lines and the vertical columns of typing have been numbered outside the limits of the straddle page. The first line at the top of the page will always give the marker group (00), the month (OCT) and the round (5) and this information will be repeated at the top of each page if the information to be transcribed is more than enough to fill a single page. It may be noted that round 5 of a month divided into six rounds (counted 0, 1, 2, 3, 4 and 5) of five days each will include the 31st (in case the month is January, March, May, July, August, October or December) the 30th, the 29th, the 28th, the 27th and the 26th, and since the information as been assembled in the reverse order to that in which it was gathered, the calls will be listed in descending order. However, since all information from the emergency recorders are processed first, the assembly of the various items may appear somewhat scrambled. The first item (line 2) will naturally be the very last item recorded at the central office having the lowest numbered call identity index by one of the emergency recorders and the rest will follow in accordance with the ascending values of the call identity index.

An explanation of this straddle page may best be made by the following account of how the information is digested and disposed of by a clerk or operator. Such clerk will first (possibly) draw a line between items 7 and 8 to segregate all those items bearing the same (00) call identity index and will then attempt to dispose of each item. The first item (line 2) appears to be a timing item and may be either an answer or a disconnect time, known to be such (1) because there is no symbol in column 1, (2) because the minutes (tens, units and tenths) appear in columns 19, 20 and 21 and (3) because of the absence of any notations beyond column 21. This first item conveys the information that a call was either answered or disconnected at 46.4 minutes after 10:00 o'clock a. m. on the 30th and that the other elements of the call will be found (CC in columns 7 and 8) in the current period's record. In columns 45 and 46, the symbols AD mean that (A) if this is an answer time entry then all charges are to be cancelled, or alternatively (D) if this is a disconnect time entry then the calling subscribed must be charged for the initial period but that overtime charges must be cancelled.

Now the operator will couple this item with the other two elements of the call. By simple scanning these are found in lines 6 and 7 so that the complete call will appear as follows:

```
 E03  00   C C   30  10   464                   A D
 R03  00   A C   30  10   205                    —C
—R03  00   A     30  10         M E6  3647   6  —C
```

In the second item the C in column 11 indicates that the third item is to be found in the current period's list and the A in column 10 indicates that such item will be an adjacent item. In item 3, the initial entry of a regular call, indicated by the — in column 1, it is indicated that the next or answer time entry is an adjacent item.

Now it will appear that since the first item bears the minutes as 46.4 and the second item bears the minutes as 20.5, that the second item must be the answer time and the first item the disconnect time. Therefore, only the overtime charges are to be cancelled, and this is confirmed by the symbols —C in columns 45 and 46 of both the second and third items which are interpreted to mean that overtime is to be cancelled. Now the operator will prepare a charge ticket—assessing against line ME6 3647 (columns 33 to 40) a charge of 2 message units. This value is derived from the fact that the message billing index 6 (column 43) within the marker group 00 indicates a rate of 2 message units for the first 5 minutes and 1 message unit for each 3 minutes thereafter, and although the call lasted apparently for 25.9 minutes (46.4—20.5) the fact that overtime was to be cancelled reduces the charge to the initial period rate of 2 message units.

This call, with all three elements appearing on the same straddle sheet, is the result of one of about one hundred and fifty-three different conditions which will cause a call to be diverted to the straddle tape. Though we are not at present concerned with the intricacies of the reasons, it does appear as a matter of interest that some trouble had occurred between the answer time and the disconnect time, when a switch was made from regular recorder 03 (R03) to the emergency recorder (E03) which cast doubt upon the validity of the time of the conversation, whereupon the signal for cancelling the overtime was given, which signal, it may be noted would affect all calls at the time in a similar stage.

This call having now been completely disposed of, the operator may scratch the three items, lines 2, 6 and 7 and consider the next.

The next call is derived from lines 3 and 5 as follows:

```
—E01  00  C   30  04                  M E6  0110   8  ——
 R01  00  C   30  04  323  30  04  247                C—
```

Here it appears that a switch from emergency recorder (E01) to a regular recorder (R01) took place between the initial entry, line 3, and the answer time which appears in columns 23 to 32 of line 5. Since some trouble had developed casting doubt on the validity of the call as a whole, a signal was given to cancel all the charges which appear in the symbols C— in columns 45 and 46 of line 5. Since all the charges are to be cancelled the operator will dispose of this call by scratching these items and proceeding to the next.

This leaves the single item shown in line 4:

L R01 00 N 31 02 ME6 1070 3 -- CUS 1758M

This is an initial entry of a line observing call. The symbol N in column 10 indicates that the remaining items of this call are to be found in the next period's entries and, therefore, the operator will make a note of these items and file the note away until the next period's straddle page comes to her attention so that the other elements of the call may be coupled with this and the full details of the call known. This disposes of the item, line 4.

The operator now scans the column of call identity indices, columns 7 and 8, and finds a single entry in line 8 which appears to be a disconnect time entry of a call the other elements of which appear on the previous period's records so that the operator will now search for a note previously made which will match this entry so that the details of the call may be properly disposed of. This completes the disposal of this item.

The operator next scans the column of call identity indices and finds four items all bearing the call identity index 26. The first item, line 9, will be found to be coupled with the item, line 12. Line 9 is an initial entry made on an emergency recorder and line 12 is a timing entry containing both the disconnect and answer times. From the answer and disconnect times in line 12 it appears that the conversation extended over 35.4 minutes and from the message billing index 7 in column 43 the charges will be at the rate of 3 message units for the first 5 minutes and 1 message unit for each 2 minutes thereafter. This would figure to be 18 message units. However, the symbol S in column 45 indicates that a certain amount of time is to be subtracted from the elapsed time due to the fact that in this case the called party disconnected first and, therefore, the running of time was not stopped immediately due to the control which the calling party has over the connection. This is known as a forced disconnect and for that reason .6 of a minute is subtracted making the elapsed time in this case 34.8 minutes which figures according to the rate above stated to be 17 message units. Therefore, the operator will make out a ticket assessing against the calling line number ME6 1987 a charge of 17 message units. Thus, the call expressed in lines 9 and 12 is disposed of.

This leaves the lines 10 and 11 as follows:

R07 26 AN 31 02 594 C--
--R07 26 A 31 02 ME6 2432 8 C--

Here we evidently have an initial entry of a call made from line ME6 2432 with an adjacent timing entry showing that the call was answered at 2:59.4 minutes but that the disconnect time must be found on the next period's straddle page. This is logical since the central office tape is generally cut at 3:00 a. m. and this call was started just prior to this period so that the call actually straddles the cut in the tape. Although it appears from the symbols in columns 45 and 46 that some trouble has occurred which will cause the cancellation of all charges, the operator will nevertheless make a note of the details of this call and file it away until the next period's straddle page comes to attention. The operator will then scratch these two items and go on to the next.

Here we find two items in lines 13 and 14 as follows:

R10 57 A 30 09 567 30 08 000 --
L R10 57 A 30 07 ME6 0945 9 -- L04 4597

This appears to be the complete information for a line observing call made over the line of station ME6 0945. From the symbols in columns 45 and 46 it was a regular call in all respects except that being a line observing call the details will be sent to the line observing operator as well as the charges assessed against the calling subscriber. By figuring the elapsed time it appears that the call extended over a period of 116.7 minutes and since the computer is arranged to divert all calls longer than 99 minutes to the straddle tape, this particular call was, therefore, diverted in that way and appears now on this straddle page. Therefore, the operator will make out a charge ticket assessing against the calling line ME6 0945 the proper charge for a toll call (symbol 9 in column 43) extending for a period of 1 hour 56.7 minutes to a called subscriber L04 4597. The operator will have for her use a list of the toll rates from the marker group G0 to other points and will, therefore, be able to translate this elapsed time of 1 hour and 56.7 minutes into the proper charge in message units or in dollars and cents. This call now having been completely digested the operator will scratch lines 13 and 14.

Lastly, the operator will scan line 15 of this page and may at once note from the symbol 0 in column 43 that this is a district test call and is, therefore, free, so that no charge will be assessed against the calling line. This is confirmed by the symbol T in column 45 which instructs the operator that this is a test call and that charges are to be cancelled. This item now having been digested the operator will scratch this last line.

The above-noted list of items has been chosen to illustrate certain typical examples of entries on a straddle page and an attempt has been made to explain briefly the reason for each entry and the manner in which it is disposed of.

Thus, the straddle circuit maintains a constant vigil so as to report any and all items of information deviating from regularity.

What is claimed is:

1. A translator for coding a plurality of two-digit numbers into a representation having fewer digits than the total digits of said numbers, comprising a register having a plurality of denominational orders, means for transmitting to a first denominational order of said register a code representation of the identity of information registered in said register, a set of relays for each said number responsive to the tens digits thereof, a contact network controlled by the said relays for a first and a third of said numbers for transmitting a code representation of the combination of the tens digits thereof to a second denominational order of said register, a contact network controlled by the said relays for a second and a third of said numbers for transmitting a code representation of the combination of the tens digits thereof to a third denominational order of said register, and means for transmitting an uncoded representation of the units digits of a first, a second and a third of said numbers to a fourth, a fifth and a sixth denominational order of said register, respectively.

2. In an automatic accounting system wherein items of information comprising data from which customer bills for services over variable time periods are derived are recorded on a continuous tape, which said tape is severed at stated intervals to be entered into a processing device for assembling, translating, computing and otherwise rearranging said items of information, and whereby complete sets of items of information may thus be separated and caused to straddle a cut in what would otherwise be a completely continuous tape, an assembler for assembling said items of information into groups of assembled calls, a computer for computing elapsed time for each assembled call, an hour circuit in said computer, a straddle circuit responsive to identity information at the leading end of each group of assembled calls, a preliminary indication means in said straddle circuit, a means responsive to said preliminary indication means for starting said hour circuit to count hours, sorting means for distributing calls to a plurality of outlets including a perforator for perforating a straddle call tape, a perforator for perforating a line observation tape and a discarding means, and means controlled by said hour circuit for controlling said sorting means.

3. In an automatic accounting system in which customer charges for uses of given facilities are derived from scattered items of specific and general information recorded on continuous tapes during and by the said customer uses of the given facilities and wherein the conversion of said data into customer bills is accomplished in a series of steps by a plurality of accounting devices each of which is adapted to read items of information from an incoming tape and to assemble, sort, translate, compute or otherwise rearrange said items and to record the result on a plurality of outgoing tapes, one of said devices consisting of a computer for transforming groups of assembled items of specific information into customer charges and to issue said charges in billable form, said computer including an input class register and a calculator, both responsive to items of information read from an incoming tape, a plurality of entry forming relays controlled by said input class register and said calculator, a plurality of pattern relays, each adapted to control the form of a single output line, each said entry forming relay controlling a predetermined one or more of said pattern relays in a predetermined sequence.

4. In an automatic accounting system in which customer charges for uses of given facilities are derived from scattered items of specific and general information recorded on continuous tapes during and by the said customer uses of the given facilities and wherein the conversion of said data into customer bills is accomplished in a series of steps by a plurality of accounting devices each of which is adapted to read items of information from an incoming tape and to assemble, sort, translate, compute or otherwise rearrange said items and to record the result on a plurality of outgoing tapes, one of said devices consisting of a computer for transforming groups of assembled items of specific information into customer charges and to issue said charges in billable form, said computer including a plurality of registers for registering incoming data and data derived by said computer, a calculator for deriving data from registered incoming data, an input class register controlled in part by incoming data and in part by derived data, a plurality of entry forming relays under control of said input class register, a plurality of pattern relays each adapted to control the form of and to derive the data for a single output line from said computer registers, each said entry forming relay controlling a predetermined one or more of said pattern relays in a predetermined sequence.

5. In an automatic accounting system in which customer charges for uses of given facilities are derived from scattered items of specific and general information recorded on continuous tapes during and by the said customer uses of the given facilities and wherein the conversion of said data into customer bills is accomplished in a series of steps by a plurality of accounting devices each of which is adapted to read items of information from an incoming tape and to assemble, sort, translate, compute or otherwise rearrange said items and to record the result on a plurality of outgoing tapes, one of said devices consisting of a computer for transforming groups of assembled items of specific information into customer charges and to issue said charges in billable form, a supervisory circuit for said computer for determining the form and composition of and the disposition of a call processed by said computer, consisting of a progress recording means for counting off and registering the receipt of various items of information, an input class register for registering the class of a call, means for signaling the termination of the input of all items for a call, means for evaluating trouble indications included among the input items of a call and an output class register jointly controlled by said elements.

6. In an automatic accounting system in which customer charges for uses of given facilities are derived from scattered items of specific and general information recorded on continuous tapes during and by the said customer uses of the given facilities and wherein the conversion of said data into customer bills is accomplished in a series of steps by a plurality of accounting devices each of which is adapted to read items of information from an incoming tape and to assemble, sort, translate, compute or otherwise rearrange said items and to record the result on a plurality of outgoing tapes, one of said devices consisting of a computer for transforming groups of assembled items of specific information into customer charges and to issue said charges in billable form, a supervisory circuit for said computer for determining the form, composition and disposition of a call entered into said computer, consisting of a progress recording means for checking off the items of information comprising a call as they are entered, an input class register for registering a primary and secondary classification of an incoming call from indications included in said entered items of information, means for recognizing the end of the incoming items of information for each call whereby it may be established that less than, exactly the proper number or more than the proper number of items of information have been registered therein, means for registering indications of irregularity in a call and an output control means jointly controlled by said elements.

7. In an automatic accounting system wherein items of information comprising data from which customer bills for services over variable time periods are derived are recorded on a continuous tape, which said tape is severed at stated intervals to be entered into a processing device for assembling, translating, computing and otherwise rearranging said items of information, an assembler for assembling said items of information into groups of assembled calls, each said group consisting in order to be read by a computer first and second of time items and third of destination and identity items, a computer for computing elapsed time from time entries included among the said items of information in an assembled group of said items constituting a call, a perforator for perforating a record of a call processed by said computer from a said assembled group of items of information, and discarding means responsive to the failure of entry of any time entries from among said group of assembled items for completely clearing said computer and advancing to another group of assembled items, said discarding means consisting of a progress recording means for checking off the items of information comprising a call as they are entered and a discarding relay responsive to the entry of a destination and identity item alone, and release means for said computer operated by said discarding relay.

8. In an automatic accounting system wherein items of information comprising data from which customer bills for services over variable time periods are derived are recorded on a continuous tape, which said tape is severed at stated intervals to be entered into a processing device for assembling, translating, computing and otherwise rearranging said items of information, an assembler for assembling said items of information into groups of assembled calls, a computer for computing elapsed time from time entries included among the said items of information in an assembled group of said items constituting a call, a perforator for perforating a record of a call processed by said computer from a said assembled group of items of information, means in said computer for checking the entry thereinto of a complete group of assembled items, releasing means for releasing said computer to render it available for entry of items of another group, and means responsive to failure to enter a single time entry from among said group of assembled items for operating said releasing means.

9. In an automatic accounting system in which customer charges for uses of given facilities are derived from scattered items of specific and general information recorded on continuous tapes during and by the said customer uses of the given facilities and wherein the conversion of said data into customer bills is accomplished in a series of steps by a plurality of accounting devices each of which is adapted to read items of information from an incoming tape and to assemble, sort, translate, compute or otherwise rearrange said items and to record the results on a plurality of outgoing tapes, one of said devices consisting of a computer for transforming groups of assembled items of information into customer charges and to issue said charges in billable form, said computer comprising a reader for reading codes from an incoming tape, a plurality of registers for registering information read by said reader and information derived therefrom, a calculator for calculating customer charges from said registered information, a plurality of recorders for recording customer charges derived from said registered information, a start circuit for starting the operation of a selected one of said recorders, and a plurality of sections in said check circuit each comprising a parallel arrangement, one branch thereof being controlled by a plurality of said registers each in one and the same condition and another branch thereof being controlled by the same plurality of registers in another one and the same condition, whereby one item of information expressed in one register may be checked against another item of information expressed in another register.

10. In an automatic accounting system in which customer charges for uses of given facilities are derived from scattered items of specific and general information recorded on continuous tapes during and by the said customer uses of the given facilities and wherein the conversion of said data into customer bills is accomplished in a series of steps by a plurality of accounting devices each of which is adapted to read items of information from an incoming tape and to assemble, sort, translate, compute or otherwise rearrange said items and to record the results on a plurality of outgoing tapes, one of said devices consisting of a computer for transforming groups of assembled items of information into customer charges and to issue said charges in billable form, said computer comprising a reader for reading codes from an incoming tape, a plurality of registers for registering information read by said reader and information derived therefrom, a calculator for calculating customer charges from said registered information, a plurality of recorders for recording customer charges derived from said registered information, a plurality of relays responsive to said registers for registering indications of general information and specific information, including, by way of example, a DK relay for indicating by its operated condition that a disconnect time followed by a cancellation signal has been registered, a DRK relay for indicating by its operated condition that a disconnect time has been registered and a D56 relay for indicating by its operated condition that a cancellation signal has been registered, a start circuit for starting the operation of a selected one of said recorders, said start circuit including a plurality of sections in series, each said section comprising a parallel circuit in one branch of which a pair of said relays controls said circuit when both are operated and in the other branch of which the said pair of relays controls said circuit when both are non-operated, whereby the said starting circuit is rendered dependent on a check of specific information against like general information.

11. In an automatic accounting system wherein items of information comprising data from which customer bills for services over variable time periods are derived are recorded on a continuous tape, said items of information being in the form of items of specific information for individual customer charges and items of general information common to a group of such individual customer charges, an hour register circuit, means for setting and correcting the registration therein from items of general information taken from an input tape, a date register set from items of general information from an input tape and a register for registering minutes from a specific item of information taken from an input tape, means for translating the tens digits of three two-digit numbers from said date register, said hour register and said minutes register, respectively, to form a two-digit code combined with the three units digits of said two-digit numbers, to form a five-digit output code, said translating means comprising a plurality of (minutes tens) relays selectively operated in accordance with the registration in and from said minutes register, a circuit network controlled by said relays controlled in accordance with the registration in and from said date register to formulate a first place digit of said five-digit output code and further controlled by said relays controlled in accordance with the registration in and from said hour register to formulate a second place digit of said five-digit code, and means for transmitting the units digits from said date register, said hour register and said minutes register to form the third, fourth and fifth digits respectively of said five-digit output code.

12. In an automatic accounting system in which customer charges for uses of given facilities are derived from scattered items of specific and general information recorded on continuous tapes during and by the said customer uses of the given facilities and wherein the conversion of said data into customer bills is accomplished in a series of steps by a plurality of accounting devices each of which is adapted to read items of information from an incoming tape and to assemble, sort, translate, compute or otherwise rearrange said items and to record the result on a plurality of outgoing tapes, one of said devices consisting of a computer for transforming groups of assembled items of information into customer charges and to issue said charges in billable form, said computer including a plurality of entry forming relays, each responsive to information entered into said computer for controlling the form and contents of the information issued from said computer and a plurality of line forming relays each for relaying information entered into or derived by said computer and gathered from various sources within said computer for forming a single computer output line, said line forming relays being under control of said entry forming relays.

ALFRED E. HAGUE.

REFERENCES CITED

The following references are of record in the file of this patent:

UNITED STATES PATENTS

| Number | Name | Date |
|---|---|---|
| 1,966,386 | Haglund | July 10, 1934 |
| 2,165,925 | Goodrum et al. | July 11, 1939 |
| 2,268,203 | Carpenter et al. | Dec. 30, 1941 |
| 2,369,474 | Luhn | Feb. 13, 1945 |
| 2,370,989 | Nichols | Mar. 6, 1945 |